(12) United States Patent
Zhang et al.

(10) Patent No.: US 12,499,551 B1
(45) Date of Patent: Dec. 16, 2025

(54) CORONARY ARTERY SEGMENTATION METHOD, ELECTRONIC DEVICE, AND COMPUTER-READABLE STORAGE MEDIUM

(71) Applicant: Infervision Medical Technology Co., Ltd., Beijing (CN)

(72) Inventors: Huan Zhang, Beijing (CN); Shaokang Wang, Beijing (CN); Kuan Chen, Beijing (CN)

(73) Assignee: Infervision Medical Technology Co., Ltd., Beijing (CN)

( * ) Notice: Subject to any disclaimer, the term of this patent is extended or adjusted under 35 U.S.C. 154(b) by 470 days.

(21) Appl. No.: 18/146,965

(22) Filed: Dec. 27, 2022

Related U.S. Application Data

(63) Continuation of application No. PCT/CN2021/130861, filed on Nov. 16, 2021.

(30) Foreign Application Priority Data

Nov. 19, 2020 (CN) .......................... 202011303653.9

(51) Int. Cl.
*G06T 7/11* (2017.01)
*G06T 7/174* (2017.01)

(52) U.S. Cl.
CPC .............. *G06T 7/11* (2017.01); *G06T 7/174* (2017.01); *G06T 2207/20101* (2013.01);
(Continued)

(58) Field of Classification Search
CPC . G06T 7/11; G06T 7/174; G06T 2207/20101; G06T 2207/20156; G06T 2207/30048; G06T 2207/30101
(Continued)

(56) References Cited

U.S. PATENT DOCUMENTS

2007/0118024 A1* 5/2007 Capolunghi .............. G06T 7/11
600/300
2011/0293150 A1 12/2011 Capolunghi et al.
(Continued)

FOREIGN PATENT DOCUMENTS

CN 101896939 A 11/2010
CN 105427329 A 3/2016
(Continued)

OTHER PUBLICATIONS

First Office Action issued in counterpart Chinese Patent Application No. 202011303653.9, dated Jul. 8, 2021.
(Continued)

*Primary Examiner* — Jennifer Mehmood
*Assistant Examiner* — Pardis Sohraby
(74) *Attorney, Agent, or Firm* — Westbridge IP LLC

(57) ABSTRACT

Disclosed are a coronary artery segmentation method, an electronic device, and a computer-readable storage medium. The coronary artery segmentation method includes: iteratively performing a detection step for a to-be-detected image; for a plurality of the detection steps corresponding to the to-be-detected image, selecting the to-be-detected region in a current detection step from the replaced to-be-detected image in a previous detection step, and using a part of the comparison result in the previous detection step as the regional coronary artery inspiration data in the current detection step; and outputting a finally replaced to-be-detected image as coronary artery segmentation data. This method implements precise segmentation, and effectively distinguishes between a coronary artery and a vein false positive.

13 Claims, 7 Drawing Sheets

(52) U.S. Cl.
CPC ............... *G06T 2207/20156* (2013.01); *G06T 2207/30048* (2013.01); *G06T 2207/30101* (2013.01)

(58) Field of Classification Search
USPC ........................................................ 382/128
See application file for complete search history.

(56) References Cited

U.S. PATENT DOCUMENTS

| | | | |
|---|---|---|---|
| 2013/0094725 A1 | 4/2013 | Gulsun et al. | |
| 2016/0042511 A1* | 2/2016 | Chukka | G06V 20/695 382/133 |
| 2017/0262733 A1* | 9/2017 | Gulsun | G06V 10/454 |
| 2022/0108455 A1* | 4/2022 | Chiu | G06T 7/292 |
| 2022/0245400 A1* | 8/2022 | Siemionow | A61B 5/4058 |

FOREIGN PATENT DOCUMENTS

| | | |
|---|---|---|
| CN | 108171698 A | 6/2018 |
| CN | 109003278 A | 12/2018 |
| CN | 109272048 A | 1/2019 |
| CN | 110176013 A | 8/2019 |
| CN | 110706233 A | 1/2020 |
| CN | 110706246 A | 1/2020 |
| CN | 111724413 A | 9/2020 |
| CN | 111815599 A | 10/2020 |
| CN | 112418299 A | 2/2021 |

OTHER PUBLICATIONS

International Search Report issued in corresponding PCT Application No. PCT/CN2021/130861, dated Jan. 29, 2022.

Notification to Grant Patent Right for Invention issued in counterpart Chinese Patent Application No. 202011303653.9, dated Sep. 24, 2021.

Shin et al., Deep vessel segmentation by learning graphical connectivity, Medical Image Analysis 58 (2019) 101556, dated Sep. 6, 2019.

* cited by examiner

CORONARY ARTERY SEGMENTATION METHOD, ELECTRONIC DEVICE, AND COMPUTER-READABLE STORAGE MEDIUM

CROSS-REFERENCE TO RELATED APPLICATIONS

The present application is a continuation application of International Application No. PCT/CN2021/130861 filed on Nov. 16, 2021, which claims priority to Chinese Patent Application No. 202011303653.9 filed on Nov. 19, 2020. Both applications are incorporated herein by reference in their entireties.

TECHNICAL FIELD

The application relates to the field of deep learning technologies, and in particular to a coronary artery segmentation method, a coronary artery segmentation apparatus, an electronic device, and a computer-readable storage medium.

BACKGROUND

Coronary artery segmentation is crucial for screening for coronary heart disease. However, due to an impact of factors such as complexity and randomness of medical images, in the existing coronary artery segmentation methods, it is difficult to effectively distinguish between a coronary artery and a vein false positive, and it is also difficult to obtain small coronary artery branches through segmentation when there are motion artifacts or coronary plaques.

Therefore, there is an urgent need for a coronary artery segmentation method, which has high segmentation accuracy, can effectively distinguish between the coronary artery and the vein false positive, and also has strong robustness to artifacts or plaques.

SUMMARY

In view of this, embodiments of the present application provide a coronary artery segmentation method, a coronary artery segmentation apparatus, an electronic device, and a computer-readable storage medium, to resolve technical problems in a coronary artery segmentation method in the prior art that it is difficult to effectively distinguish between a coronary artery and a vein false positive, and it is also difficult to obtain small coronary artery branches through segmentation when there are motion artifacts or coronary plaques.

According to an aspect of the present application, a coronary artery segmentation method is provided, including: iteratively performing a detection step for a to-be-detected image, wherein the detection step includes the following steps: obtaining a to-be-detected region and regional coronary artery inspiration data corresponding to the to-be-detected region, where the to-be-detected region is a part of the to-be-detected image, and the regional coronary artery inspiration data is used to provide an inspiration during segmentation of the to-be-detected region; inputting the to-be-detected region with the regional coronary artery inspiration data into a pre-trained coronary artery segmentation model to obtain regional coronary artery segmentation data; obtaining a comparison result of the regional coronary artery segmentation data and the regional coronary artery inspiration data; replacing the to-be-detected region in a to-be-detected image with the comparison result to obtain a replaced to-be-detected image so as to complete the detection step; repeating the detection step, where for a plurality of detection steps corresponding to the to-be-detected image, the to-be-detected region in a current detection step is selected from the replaced to-be-detected image in a previous detection step, and a part of the comparison result in the previous detection step is used as the regional coronary artery inspiration data in the current detection step; and outputting coronary artery segmentation data after the to-be-detected image is fully traversed and replaced by the comparison result.

In an embodiment, the to-be-detected region is a coronary artery origin region. The obtaining a to-be-detected region and regional coronary artery inspiration data corresponding to the to-be-detected region includes: obtaining coronary artery origin segmentation data based on the to-be-detected image; extracting a first framework from the coronary artery origin segmentation data; selecting a first seed point on the first framework according to a first preset step length; pushing the first seed point into a seed point stack to obtain a first stack top seed point; selecting, on the to-be-detected image by using the center of the first stack top seed point as the center, a first region with a first preset size as the to-be-detected region; and using the coronary artery origin segmentation data in the first region as the regional coronary artery inspiration data.

In an embodiment, the obtaining a to-be-detected region and regional coronary artery inspiration data corresponding to the to-be-detected region includes: obtaining newly added coronary artery segmentation data from the comparison result in the previous detection step; extracting a second framework from the newly added coronary artery segmentation data; selecting a second seed point on the second framework according to a second preset step length; pushing the second seed point into a seed point stack to obtain a second stack top seed point; selecting, on the replaced to-be-detected image in the previous detection step by using the center of the second stack top seed point as the center, a second region with a second preset size as the to-be-detected region, where the second region covers a part of the comparison result in the previous detection step; and using the comparison result in the previous detection step in the second region as the regional coronary artery inspiration data.

In an embodiment, the obtaining a comparison result of the regional coronary artery segmentation data and the regional coronary artery inspiration data includes: when regions segmented by using the regional coronary artery segmentation data are more than those segmented by using the regional coronary artery inspiration data, selecting the regional coronary artery segmentation data as the comparison result; or when regions segmented by using the regional coronary artery segmentation data are not more than those segmented by using the regional coronary artery inspiration data, selecting the regional coronary artery inspiration data as the comparison result.

In an embodiment, a training method of the coronary artery segmentation model includes: obtaining a sample, where the sample includes to-be-identified region blood vessel data and coronary artery labeling data; adding interference data to the to-be-identified region blood vessel data to obtain to-be-identified blood vessel expansion data; obtaining coronary artery inspiration data based on the coronary artery labeling data, where the coronary artery inspiration data is used to provide, during labeling of the to-be-identified region blood vessel data, an inspiration for providing a neural network model with an accurate origin point; and inputting the sample with the to-be-identified blood vessel expansion data, the coronary artery inspiration data, and the coronary artery labeling data into the neural network model, and training the neural network model, so that the neural network model can output the coronary artery labeling data based on the coronary artery inspiration data on the sample. The obtaining coronary artery inspiration data based on the coronary artery labeling data includes: selecting a part of the coronary artery labeling data as the coronary artery inspiration data.

In an embodiment, the adding interference data to the to-be-identified region blood vessel data to obtain to-be-identified blood vessel expansion data includes: adding noise data to the to-be-identified region blood vessel data, where the noise data includes plaque data and artifact data; and adding false positive data to the to-be-identified region blood vessel data.

In an embodiment, the inputting the sample with the to-be-identified blood vessel expansion data, the coronary artery inspiration data, and the coronary artery labeling data into the neural network model, and training the neural network model includes: training the neural network model by using the sample with the to-be-identified blood vessel expansion data and the coronary artery inspiration data to obtain coronary artery segmentation data; obtaining a loss result based on the coronary artery segmentation data and the coronary artery labeling data; and adjusting parameters of the neural network model based on the loss result.

In an embodiment, the obtaining a sample includes: obtaining an original image, where the original image includes a to-be-identified blood vessel and a coronary artery label; and performing sliding window processing on the original image to obtain a plurality of the samples.

According to another aspect of the present application, a coronary artery segmentation apparatus is provided, including: a segmentation obtaining module, configured to obtain a to-be-detected region and regional coronary artery inspiration data, where the regional coronary artery inspiration data is used to provide an inspiration during segmentation of the to-be-detected region; a segmentation module, configured to input the to-be-detected region with the regional coronary artery inspiration data into a pre-trained coronary artery segmentation model to obtain regional coronary artery segmentation data; a comparison and determining module, configured to obtain a comparison result of the regional coronary artery segmentation data and the regional coronary artery inspiration data; a replacement module, configured to replace the to-be-detected region in a to-be-detected image with the comparison result to obtain a replaced to-be-detected image so as to complete a detection step; and an output module, configured to repeat the detection step, where for a plurality of the detection steps corresponding to the to-be-detected image, the to-be-detected region in a current detection step is selected from the replaced to-be-detected image in a previous detection step, and a part of the comparison result in the previous detection step is used as the regional coronary artery inspiration data in the current detection step; and output coronary artery segmentation data after the to-be-detected image is fully traversed and replaced by the comparison result.

In an embodiment, the to-be-detected region is a coronary artery origin region. The segmentation obtaining module includes: an origin segmentation submodule, configured to obtain coronary artery origin segmentation data based on the to-be-detected image; a first extraction submodule, configured to extract a first framework from the coronary artery origin segmentation data; a first seed point selection submodule, configured to select a first seed point on the first framework according to a first preset step length; a first stack top seed point obtaining submodule, configured to push the first seed point into a seed point stack to obtain a first stack top seed point; a first region obtaining submodule, configured to select, on the to-be-detected image by using the center of the first stack top seed point as the center, a first region with a first preset size as the to-be-detected region; and a first inspiration obtaining submodule, configured to use the coronary artery origin segmentation data in the first region as the regional coronary artery inspiration data.

In an embodiment, the to-be-detected region is from the replaced to-be-detected image in the previous detection step. The segmentation obtaining module further includes: a newly added data obtaining submodule, configured to obtain newly added coronary artery segmentation data from the comparison result in the previous detection step; a second extraction submodule, configured to extract a second framework from the newly added coronary artery segmentation data; a second seed point selection submodule, configured to select a second seed point on the second framework according to a second preset step length; a second stack top seed point obtaining submodule, configured to push the second seed point into the seed point stack to obtain a second stack top seed point; a second region obtaining submodule, configured to select, on the replaced to-be-detected image in the previous detection step by using the center of the second stack top seed point as the center, a second region with a second preset size as the to-be-detected region, where the second region covers a part of the comparison result in the previous detection step; and a second inspiration obtaining submodule, configured to use the comparison result in the previous detection step in the second region as the regional coronary artery inspiration data.

In an embodiment, the comparison and determining module is further configured to when regions segmented by using the regional coronary artery segmentation data are more than those segmented by using the regional coronary artery inspiration data, select the regional coronary artery segmentation data as the comparison result; or when regions segmented by using the regional coronary artery segmentation data are not more than those segmented by using the regional coronary artery inspiration data, select the regional coronary artery inspiration data as the comparison result.

In an embodiment, the coronary artery segmentation apparatus further includes: a sample obtaining module, configured to obtain a sample, where the sample includes to-be-identified region blood vessel data and coronary artery labeling data; an expansion module, configured to add interference data to the to-be-identified region blood vessel data to obtain to-be-identified blood vessel expansion data; an inspiration obtaining module, configured to obtain coronary artery inspiration data based on the coronary artery labeling data, where the coronary artery inspiration data is used to provide, during labeling of the to-be-identified region blood vessel data, an inspiration for providing a neural network model with an accurate origin point, where the obtaining coronary artery inspiration data based on the coronary artery labeling data includes: selecting a part of the coronary artery labeling data as the coronary artery inspiration data; and a labeling module, configured to input the sample with the to-be-identified blood vessel expansion data, the coronary artery inspiration data, and the coronary artery labeling data into the neural network model, and train the neural network model, so that the neural network model can output the coronary artery labeling data based on the coronary artery inspiration data on the sample.

In an embodiment, the expansion module further includes: a noise expansion submodule, configured to add noise data to the to-be-identified region blood vessel data, where the noise data includes plaque data and artifact data; and a false positive expansion submodule, configured to add false positive data to the to-be-identified region blood vessel data.

In an embodiment, the labeling module further includes: an output submodule, configured to train the neural network model by using the sample with the to-be-identified blood vessel expansion data and the coronary artery inspiration data to obtain the coronary artery segmentation data; a loss submodule, configured to obtain a loss result based on the coronary artery segmentation data and the coronary artery labeling data; and an adjustment submodule, configured to adjust parameters of the neural network model based on the loss result.

In an embodiment, the sample obtaining module further includes: an original image obtaining submodule, configured to obtain an original image, where the original image includes a to-be-identified blood vessel and a coronary artery label; and a preprocessing submodule, configured to perform sliding window processing on the original image to obtain a plurality of the samples.

According to still another aspect of the present application, an electronic device is provided, including: a processor; and a memory, where the memory stores computer program instructions, and when the computer program instructions are run by the processor, the processor is configured to implement a coronary artery segmentation method, the coronary artery segmentation method including: iteratively performing a detection step for a to-be-detected image, wherein the detection step includes the following steps: obtaining a to-be-detected region and regional coronary artery inspiration data corresponding to the to-be-detected region, where the to-be-detected region is a part of the to-be-detected image, and the regional coronary artery inspiration data is used to provide an inspiration during segmentation of the to-be-detected region; inputting the to-be-detected region with the regional coronary artery inspiration data into a pre-trained coronary artery segmentation model to obtain regional coronary artery segmentation data; obtaining a comparison result of the regional coronary artery segmentation data and the regional coronary artery inspiration data; replacing the to-be-detected region in the to-be-detected image with the comparison result to obtain a replaced to-be-detected image so as to complete the detection step; and for a plurality of detection steps corresponding to the to-be-detected image, selecting the to-be-detected region in a current detection step from the replaced to-be-detected image in a previous detection step, and using a part of the comparison result in the previous detection step as the regional coronary artery inspiration data in the current detection step; outputting a finally replaced to-be-detected image as coronary artery segmentation data after the to-be-detected image is fully traversed and replaced by the comparison result.

In an embodiment, the to-be-detected region is a coronary artery origin region. The obtaining a to-be-detected region and regional coronary artery inspiration data corresponding to the to-be-detected region includes: obtaining coronary artery origin segmentation data based on the to-be-detected image; extracting a first framework from the coronary artery origin segmentation data; selecting a first seed point on the first framework according to a first preset step length; pushing the first seed point into a seed point stack to obtain a first stack top seed point; selecting, on the to-be-detected image by using the center of the first stack top seed point as the center, a first region with a first preset size as the to-be-detected region; and using the coronary artery origin segmentation data in the first region as the regional coronary artery inspiration data.

In an embodiment, the obtaining a to-be-detected region and regional coronary artery inspiration data corresponding to the to-be-detected region includes: obtaining newly added coronary artery segmentation data from the comparison result in the previous detection step; extracting a second framework from the newly added coronary artery segmentation data; selecting a second seed point on the second framework according to a second preset step length; pushing the second seed point into a seed point stack to obtain a second stack top seed point; selecting, on the replaced to-be-detected image in the previous detection step by using the center of the second stack top seed point as the center, a second region with a second preset size as the to-be-detected region, where the second region covers a part of the comparison result in the previous detection step; and using the comparison result in the previous detection step in the second region as the regional coronary artery inspiration data.

In an embodiment, the obtaining a comparison result of the regional coronary artery segmentation data and the regional coronary artery inspiration data includes: when regions segmented by using the regional coronary artery segmentation data are more than those segmented by using the regional coronary artery inspiration data, selecting the regional coronary artery segmentation data as the comparison result; or when regions segmented by using the regional coronary artery segmentation data are not more than those segmented by using the regional coronary artery inspiration data, selecting the regional coronary artery inspiration data as the comparison result.

In an embodiment, a training method of the coronary artery segmentation model includes: obtaining a sample, where the sample includes to-be-identified region blood vessel data and coronary artery labeling data; adding interference data to the to-be-identified region blood vessel data to obtain to-be-identified blood vessel expansion data; obtaining coronary artery inspiration data based on the coronary artery labeling data, where the coronary artery inspiration data is used to provide, during labeling of the to-be-identified region blood vessel data, an inspiration for providing a neural network model with an accurate origin point; and inputting the sample with the to-be-identified blood vessel expansion data, the coronary artery inspiration data, and the coronary artery labeling data into the neural network model, and training the neural network model. The obtaining coronary artery inspiration data based on the coronary artery labeling data includes: selecting a part of the coronary artery labeling data as the coronary artery inspiration data.

In an embodiment, the adding interference data to the to-be-identified region blood vessel data to obtain to-be-identified blood vessel expansion data includes: adding noise data to the to-be-identified region blood vessel data, where the noise data includes plaque data and artifact data; and adding false positive data to the to-be-identified region blood vessel data.

In an embodiment, the inputting the sample with the to-be-identified blood vessel expansion data, the coronary artery inspiration data, and the coronary artery labeling data into the neural network model, and training the neural network model includes: training the neural network model by using the sample with the to-be-identified blood vessel expansion data and the coronary artery inspiration data to obtain coronary artery segmentation data; obtaining a loss result based on the coronary artery segmentation data and the coronary artery labeling data; and adjusting parameters of the neural network model based on the loss result.

In an embodiment, the obtaining a sample includes: obtaining an original image, where the original image includes a to-be-identified blood vessel and a coronary artery label; and performing sliding window processing on the original image to obtain a plurality of the samples.

According to yet another aspect of the present application, a computer-readable storage medium is provided, where the computer-readable storage medium stores a computer program instruction, and when the computer program instruction is run by a processor, the processor is configured to implement the coronary artery segmentation method according to any one of the foregoing aspects.

According to the coronary artery segmentation method provided in the embodiments of the present application, a to-be-detected region with regional coronary artery inspiration data is input into the foregoing coronary artery segmentation model, to obtain regional coronary artery segmentation data of the to-be-detected region. A comparison is performed to determine whether more regions are segmented by using the regional coronary artery segmentation data or the regional coronary artery inspiration data, to obtain a comparison result. The to-be-detected region in a to-be-detected image is replaced with the comparison result, and a replaced to-be-detected image is obtained so as to complete a detection step. The detection step is repeated. A new to-be-detected region is selected from the replaced to-be-detected image, and a part of the comparison result in a previous detection step is used as regional coronary artery inspiration data in a current detection step. The detection step is repeated iteratively until the to-be-detected image is fully traversed and replaced by the comparison result, and then a coronary artery segmentation result is obtained. A part of a segmentation result in the previous detection step is used as the regional coronary artery inspiration data in a current detection step, to provide an inspiration for segmentation in the current detection step. In addition, growth connectivity of coronary artery blood vessels is fully utilized, thereby implementing precise segmentation while effectively distinguishing between a coronary artery and a vein false positive, and further implementing strong robustness to artifacts or plaques.

According to a method for training a coronary artery segmentation model in the coronary artery segmentation method provided in the embodiments of the present application, interference data is added to to-be-identified region blood vessel data of the sample to obtain to-be-identified blood vessel expansion data. Coronary artery labeling data of the sample is processed to obtain coronary artery inspiration data used to provide an inspiration for the to-be-identified region blood vessel data during segmentation. The sample with the to-be-identified blood vessel expansion data, the coronary artery inspiration data and the coronary artery labeling data is input into a neural network model for training, so that the neural network model can output the coronary artery labeling data based on the inspiration of the coronary artery inspiration data on the sample. Due to the existence of interference data in the to-be-identified blood vessel expansion data, the neural network model is trained by using the sample, to make the neural network model learn how to distinguish interference, thereby implementing precise segmentation. The coronary artery inspiration data provides a partial inspiration. Due to connectivity of coronary arteries, the neural network model is trained by using the sample, to make the neural network model learn how to obtain all coronary artery segmentation results based on the partial inspiration.

DETAILED DESCRIPTION OF THE EMBODIMENTS

Figure 1:
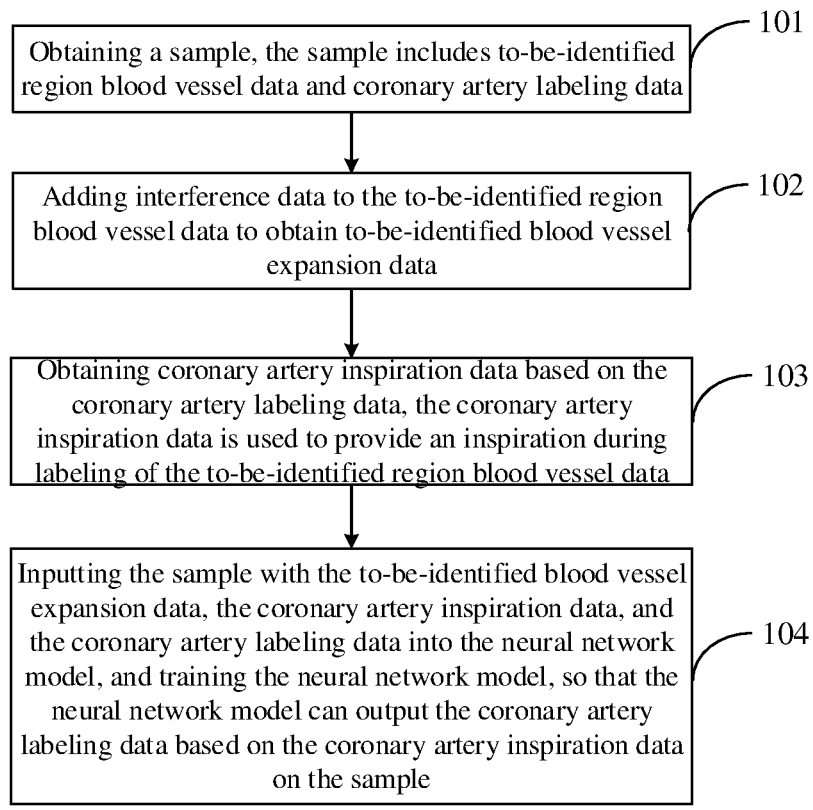
FIG. 1 is a schematic flowchart of a method for training a coronary artery segmentation model according to an embodiment of the present application.

The following clearly describes the technical solutions in the embodiments of the present application with reference to the accompanying drawings in the embodiments of the present application. Apparently, the described embodiments are merely some but not all of the embodiments of the present application. All other embodiments obtained by a person of ordinary skill in the art based on the embodiments of the present application without creative efforts fall within the protection scope of the present application.

Overview

Deep learning realizes artificial intelligence in a computing system by building a hierarchical artificial neural network. Since the hierarchical artificial neural network can perform extraction and filtering on input information layer by layer, deep learning has a capability of representative learning and may realize supervised and unsupervised end-to-end learning. The hierarchical artificial neural network used in deep learning has various forms, and complexity of its hierarchy is commonly referred to as "depth". According to construction types, deep learning includes multilayer perceptrons, convolutional neural networks, recurrent neural networks, deep belief networks, and other hybrid construction forms. Deep learning uses data to update parameters in construction to achieve a training target. This step is commonly referred to as "learning". Based on deep learning, a method in which computers automatically learn pattern features is proposed, and feature learning is integrated into steps of building models, thereby reducing the incompleteness caused by artificially designed feature.

Neural network is an operation model, which is composed of a large number of nodes (or referred to as neurons) connected to each other. Each node corresponds to a strategic function, and the connection between every two nodes represents a weighted value for a signal passing through the connection, which is referred to as a weight. The neural network generally includes a plurality of neural network layers, and an upper network layer and a lower network layer are cascaded with each other. The output of an $i^{th}$ neural network layer is connected to the input of an $(i+1)^{th}$ neural network layer, and the output of the $(i+1)^{th}$ neural network layer is connected to the input of an $(i+2)^{th}$ neural network layer, and so on. After a training sample is input into the cascaded neural network layers, each neural network layer outputs an output result, and the output result is used as the input of a next neural network layer. In this way, an output is obtained through calculation of a plurality of neural network layers, and a predicted result output from an output layer is compared with an actual target value. Then the weight matrix and strategic function of each layer are adjusted according to a difference between the predicted result and the actual target value. The neural network continuously performs the foregoing adjustment step by using the training sample to adjust parameters such as the weight of the neural network, until the predicted result output by the neural network is consistent with the actual target results. This step is referred to as training step of the neural network. After training of the neural network completes, a neural network model may be obtained.

Cardiovascular disease is one of the diseases with the highest morbidity and mortality in the world today. Coronary Computed Tomography Angiography (CTA) based on Computed Tomography images is one of the most commonly used methods for early screening for coronary heart disease. With the continuous development of medical imaging technology, a higher requirement is proposed clinically for accuracy and automation of coronary CTA image processing.

However, due to complexity and randomness of CT images, segmentation of a cardiac coronary artery is a difficult problem. Specific reasons are as follows: a structure of coronary arteries is complex, and there are many branches of small blood vessels; a grayscale of coronary arteries is uneven, a contrast with surrounding tissues is low, and a boundary of a peripheral part of a blood vessel is blurred; there are various complex lesions in coronary arteries; cardiac motion artifacts affect imaging of coronary arteries; and a heart has many veins intersected with coronary arteries, and when image quality is not high, veins seem to be connected to coronary arteries, which easily causes a segmented vein false positive.

In view of the foregoing technical problems, the basic concept of the present application is as follows.

According to a coronary artery segmentation method provided in the embodiments of the present application, a to-be-detected region with regional coronary artery inspiration data is input into a coronary artery segmentation model, to obtain regional coronary artery segmentation data of the to-be-detected region. A comparison is performed to determine whether more segmentation regions are segmented by using the regional coronary artery segmentation data or the regional coronary artery inspiration data, to obtain a comparison result. The to-be-detected region in a to-be-detected image is replaced with the comparison result, to obtain a replaced to-be-detected image. A new to-be-detected region is selected from the replaced to-be-detected image, and a part of the comparison result in a previous detection step is used as the regional coronary artery inspiration data in a current detection step. The detection step is repeated iteratively until the to-be-detected image is fully traversed and replaced by the comparison result, and then a coronary artery segmentation result is obtained. In this method, a part of a segmentation result in the previous detection step is used as the regional coronary artery inspiration data in the current detection step, to provide an inspiration for segmentation in the current detection step. In addition, growth connectivity of coronary artery blood vessels is fully utilized, thereby implementing precise segmentation while effectively distinguishing between a coronary artery and a vein false positive, and further implementing strong robustness to artifacts or plaques.

Moreover, for the coronary artery segmentation model in the foregoing coronary artery segmentation method, the embodiments of the present application also provide a method for training the coronary artery segmentation model. According to a method, interference data is added to to-be-identified region blood vessel data of a sample to obtain to-be-identified blood vessel expansion data. Coronary artery labeling data of the sample is processed to obtain coronary artery inspiration data used to provide an inspiration for the to-be-identified region blood vessel data during segmentation. The sample with the to-be-identified blood vessel expansion data, the coronary artery inspiration data and the coronary artery labeling data is input into a neural network model for training, so that the neural network model can output the coronary artery labeling data based on the inspiration of the coronary artery inspiration data on the sample. Due to the existence of interference data in the to-be-identified blood vessel expansion data, the neural network model is trained by using the sample, to make the neural network model learn how to distinguish interference, thereby implementing precise segmentation. In addition, the coronary artery inspiration data provides a partial inspiration. Due to connectivity of coronary arteries, the neural network model is trained by using the sample, to make the neural network model learn how to obtain all coronary artery segmentation results based on the partial inspiration.

After the basic principles of the present application are introduced, various non-limiting embodiments of the present application will be described in detail below with reference to the accompanying drawings.

Exemplary Method for Training Coronary Artery Segmentation Model

FIG. 1 is a schematic flowchart of a method for training a coronary artery segmentation model according to an embodiment of the present application. As shown in FIG. 1, the method for training a coronary artery segmentation model includes the following steps.

Step 101: Obtaining a sample, the sample includes to-be-identified region blood vessel data and coronary artery labeling data.

Specifically, the sample is a part of a labeled cardiac CT image, and the labeled cardiac CT image includes a to-be-identified blood vessel and a coronary artery label with which a coronary artery has been segmented. Since the sample is a part of the labeled cardiac CT image, the sample includes the to-be-identified region blood vessel data and the coronary artery labeling data. The coronary artery labeling data is coronary artery vessels that have been labeled and segmented.

It should be understood that, the labeled cardiac CT image may only be required to be segmented into a plurality of samples, and a segmentation method is not specifically limited in the embodiment of the present application. A coronary artery on the labeled cardiac CT image is only required to be labeled. Specifically, whether the coronary artery is labeled manually or in another method is not specifically limited in the embodiment of the present application.

Step 102: Adding interference data to the to-be-identified region blood vessel data to obtain to-be-identified blood vessel expansion data.

Specifically, the coronary artery is difficult to be identified due to presence of a cardiac motion artifact, a plaque and a vein false positive in the to-be-identified blood vessel. The interference data is added to the to-be-identified region blood vessel data, to obtain the to-be-identified blood vessel expansion data. Then a neural network model is trained by using the to-be-identified blood vessel expansion data, so that the neural network model has a capability of interference rejection and precise segmentation.

Step 103: Obtaining coronary artery inspiration data based on the coronary artery labeling data, the coronary artery inspiration data is used to provide an inspiration during labeling of the to-be-identified region blood vessel data.

Specifically, for the coronary artery segmentation model in the related art, a neural network model is trained by using the sample, and a labeled coronary artery blood vessel in the sample is used as an output target, so that the neural network model learns a capability of how to identify a coronary artery blood vessel based on the to-be-identified blood vessel. However, due to an impact of an interference factor, a coronary artery blood vessel segmentation result output by the trained neural network model may be different from the labeled coronary artery blood vessel, and thus the neural network model has a relatively low output robustness.

Considering that blood vessels have connectivity and the coronary artery inspiration data indicates a part of labeled to-be-identified blood vessels, during training of the neural network model, the coronary artery inspiration data not only provides the neural network model with the to-be-identified region blood vessel data and the coronary artery labeling data that is used as an output target, but also provides the neural network model with an inspiration, for example, a part of segmented blood vessel sources. Growth connectivity of blood vessels is fully utilized, so that a segmentation result output by the neural network model is more accurate. The coronary artery inspiration data is obtained based on the coronary artery labeling data, providing an accurate origin point for the neural network model as the inspiration.

Step 104: Inputting the sample with the to-be-identified blood vessel expansion data, the coronary artery inspiration data, and the coronary artery labeling data into the neural network model, and training the neural network model, so that the neural network model can output the coronary artery labeling data based on the coronary artery inspiration data on the sample.

Exemplarily, the obtaining coronary artery inspiration data based on the coronary artery labeling data includes: selecting a part of the coronary artery labeling data as the coronary artery inspiration data.

Specifically, the sample with the to-be-identified blood vessel expansion data, the coronary artery inspiration data, and the coronary artery labeling data is input into the neural network model to enable the neural network model to obtain a rejection interference item based on an inspiration factor provided by the coronary artery inspiration data and by taking the coronary artery labeling data as the output target, so that precise segmentation may be implemented even if there are artifacts or plaques. Therefore, the neural network model can output all accurate coronary artery segmentation results according to a partial inspiration and based on the connectivity of coronary arteries.

In the embodiment of the present application, interference data is added to to-be-identified region blood vessel data of the sample, to obtain to-be-identified blood vessel expansion data; the coronary artery labeling data of the sample is processed to obtain the coronary artery inspiration data used to provide an inspiration for the to-be-identified region blood vessel data during segmentation; and the sample with the to-be-identified blood vessel expansion data, the coronary artery inspiration data, and the coronary artery labeling data is input into the neural network model for training, so that the neural network model can output the coronary artery labeling data based on an inspiration of the coronary artery inspiration data on the sample. Since there is interference data in the to-be-identified blood vessel expansion data, the neural network model is trained by using the sample, to make the neural network model learn how to distinguish interference, thereby implementing precise segmentation. In addition, the coronary artery inspiration data provides a partial inspiration. Due to connectivity of coronary arteries, the neural network model is trained by using the sample, to make the neural network model learn how to obtain all coronary artery segmentation results based on the partial inspiration.

Figure 2:
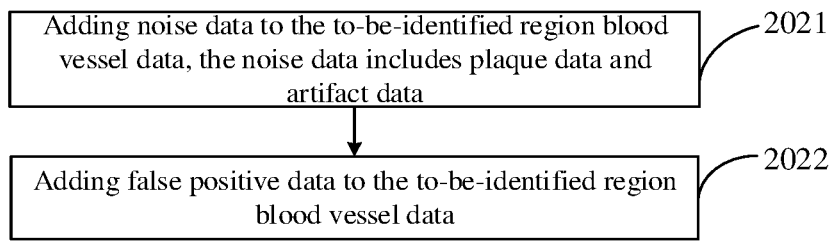
FIG. 2 is a schematic flowchart of obtaining to-be-identified blood vessel expansion data in a method for training a coronary artery segmentation model according to an embodiment of the present application.

FIG. 2 is a schematic flowchart of obtaining to-be-identified blood vessel expansion data in a method for training a coronary artery segmentation model according to an embodiment of the present application. As shown in FIG. 2, the adding interference data to to-be-identified region blood vessel data to obtain to-be-identified blood vessel expansion data includes the following steps.

Step 2021: Adding noise data to the to-be-identified region blood vessel data, the noise data includes plaque data and artifact data.

Specifically, limited by complexity of CT images, an impact of the noise data such as the plaque data and the artifact data makes coronary artery segmentation robustness relatively low. The noise data is added to the to-be-identified region blood vessel data to train a neural network model, so that the neural network model has a capability of implementing precise segmentation by identifying an interference factor.

Step 2022: Adding false positive data to the to-be-identified region blood vessel data.

Specifically, since a coronary artery and a coronary vein are very similar in shape and have a very close grayscale, the neural network model is difficult to distinguish between the coronary artery and the coronary vein, and then mistakes the coronary vein as a target, forming a vein false positive. The false positive data is added to the to-be-identified region blood vessel data to train the neural network model, so that the neural network model has a capability of distinguishing between the coronary vein and the coronary artery.

A specific method for adding false positive data to the to-be-identified region blood vessel data may be fusing blood vessel data of another region into the to-be-identified region blood vessel data, except for a labeled coronary vessel represented by coronary artery labeling data. It should be understood that, it is only required that the blood vessel data of another region can be fused into the to-be-identified region blood vessel data, and a specific fusion method is not limited in the present application.

Figure 3:
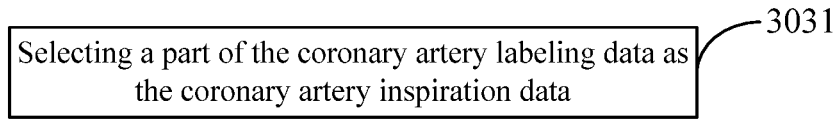
FIG. 3 is a schematic flowchart of obtaining coronary artery inspiration data in a method for training a coronary artery segmentation model according to an embodiment of the present application.

FIG. 3 is a schematic flowchart of obtaining coronary artery inspiration data in a method for training a coronary artery segmentation model according to an embodiment of the present application. As shown in FIG. 3, the obtaining coronary artery inspiration data based on coronary artery labeling data includes the following steps.

Step 3031: Selecting a part of the coronary artery labeling data as the coronary artery inspiration data.

Specifically, considering that the coronary artery inspiration data is to provide an inspiration during labeling of to-be-identified region blood vessel data, the selected part of the coronary artery labeling data is used as the coronary artery inspiration data, to provide a basis for subsequent blood vessel segmentation.

In the embodiment of the present application, the selected part of the coronary artery labeling data is used as the coronary artery inspiration data, to provide a basis for subsequent blood vessel segmentation.

Figure 4:
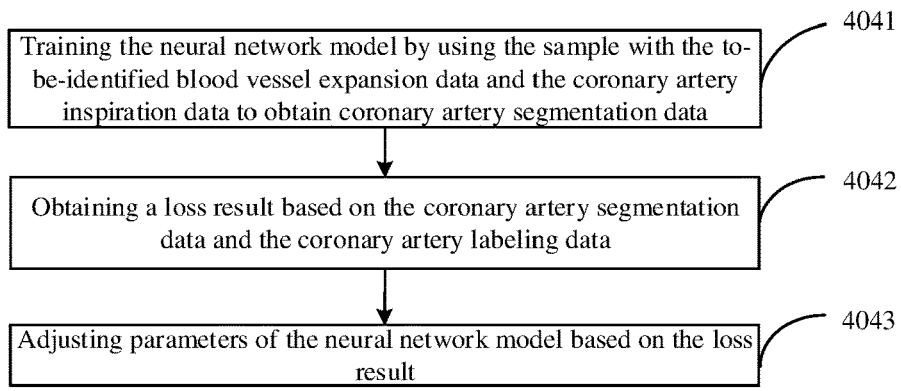
FIG. 4 is a schematic flowchart of training a neural network model in a method for training a coronary artery segmentation model according to an embodiment of the present application.

FIG. 4 is a schematic flowchart of training a neural network model in a method for training a coronary artery segmentation model according to an embodiment of the present application. As shown in FIG. 4, a sample with to-be-identified blood vessel expansion data and the coronary artery inspiration data is input into the neural network model. When connectivity of blood vessels provided by the coronary artery inspiration data is considered and coronary artery labeling data is taken as an output target, the training the neural network model includes the following steps.

Step 4041: Training the neural network model by using the sample with the to-be-identified blood vessel expansion data and the coronary artery inspiration data to obtain the coronary artery segmentation data.

Specifically, the sample is input into the neural network model, and the coronary artery segmentation data is output. The coronary artery segmentation data is a prediction result of segmentation performed by the neural network model on the to-be-identified blood vessel expansion data.

Step 4042: Obtaining a loss result based on the coronary artery segmentation data and the coronary artery labeling data.

Specifically, the coronary artery labeling data is an input reference value, and the coronary artery segmentation data is an output value. There is a difference between the output value and the input reference value, and thus the loss result of the two is obtained.

Step 4043: Adjusting parameters of the neural network model based on the loss result.

Specifically, when there is a difference between the output value and the input reference value, there is a need to adjust the parameters of the neural network model, and the adjustment of the parameters of the neural network model does not stop until the loss result is within a preset range. The loss result within the preset range indicates that a difference between the coronary artery segmentation data and the coronary artery labeling data is within the preset range.

In the embodiment of the present application, the sample is input into a neural network model, to obtain the coronary artery segmentation data. The coronary artery labeling data is an input reference value, the coronary artery segmentation data is an output value, and thus a loss result of the two is obtained. Parameters of the neural network model are adjusted, and the adjustment of the parameters of the neural network model does not stop until the loss result is within a preset range. In this way, a precise segmentation capability of the model is improved.

Figure 5:
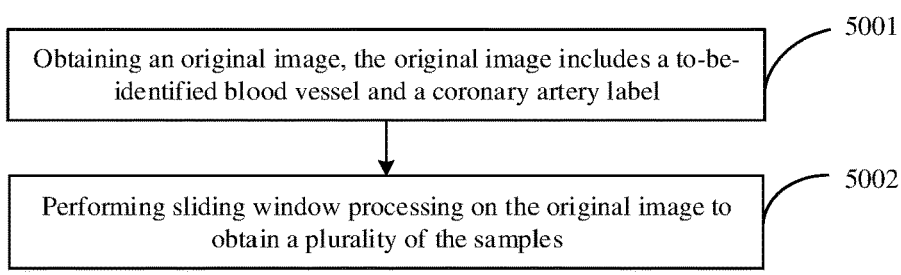
FIG. 5 is a schematic flowchart of obtaining a sample in a method for training a coronary artery segmentation model according to an embodiment of the present application.

FIG. 5 is a schematic flowchart of obtaining a sample in a method for training a coronary artery segmentation model according to an embodiment of the present application. As shown in FIG. 5, the obtaining a sample includes the following steps.

Step 5001: Obtaining an original image, the original image includes a to-be-identified blood vessel and a coronary artery label.

Specifically, the original image is a cardiac CT image, and the cardiac CT image includes the to-be-identified blood vessel and a coronary artery label that has been labeled.

Step 5002: Performing sliding window processing on the original image to obtain a plurality of the samples.

In the embodiment of the present application, a plurality of the samples are obtained by performing sliding window processing on an original image, and the original image is segmented into a plurality of the samples for processing respectively, so as to improve deep learning efficiency of a neural network model.

Exemplary Coronary Artery Segmentation Method

Figure 6:
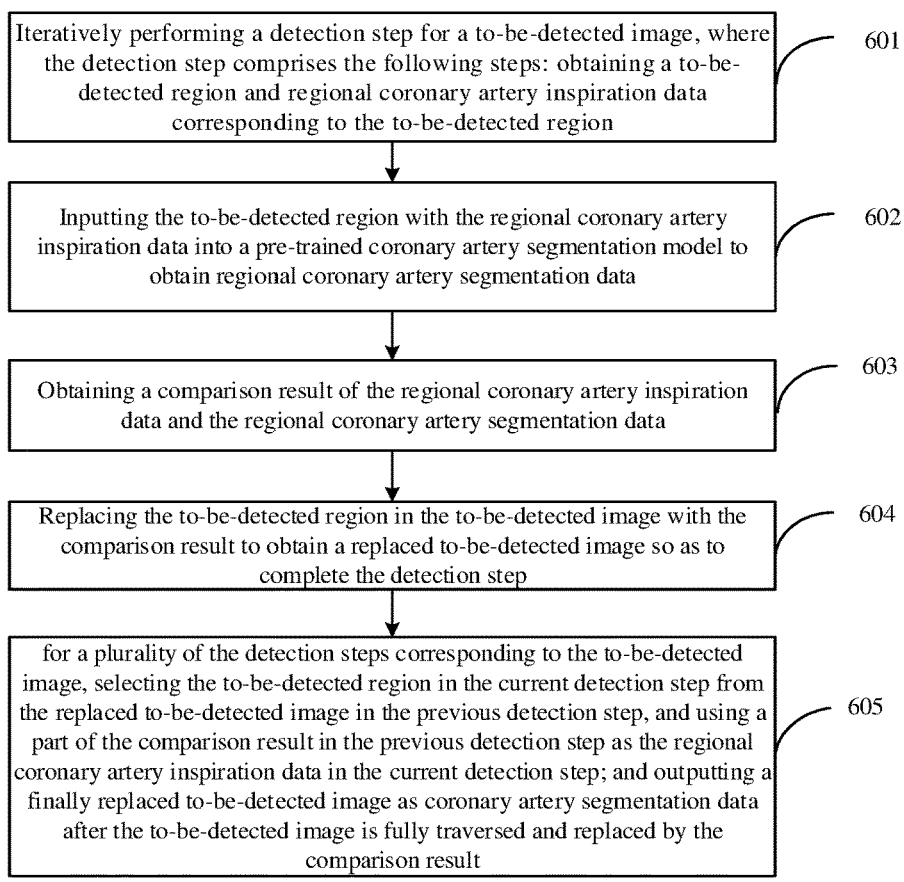
FIG. 6 is a schematic flowchart of a coronary artery segmentation method according to an embodiment of the present application.

FIG. 6 is a schematic flowchart of a coronary artery segmentation method according to an embodiment of the present application. As shown in FIG. 6, the coronary artery segmentation method includes the following steps.

Step 601: Iteratively performing a detection step for a to-be-detected image, where the detection step comprises the following steps: obtaining a to-be-detected region and regional coronary artery inspiration data corresponding to the to-be-detected region.

The to-be-detected region is a part of the to-be-detected image, and the regional coronary artery inspiration data is used to provide an inspiration during segmentation of the to-be-detected region.

A to-be-detected image may be divided into a plurality of to-be-detected regions according to different selection rules. An entire segmentation process may include a plurality of detection steps. When a detection step is the first step in the entire segmentation process, the to-be-detected region is a coronary artery origin region. When the detection step is not the first step in the entire segmentation process, the to-be-detected region is from a replaced to-be-detected image in the previous detection step of a current detection step. The regional coronary artery inspiration data is data to provide, during segmentation of the to-be-detected image by a coronary artery segmentation model, an inspiration for outputting a segmentation result corresponding to the to-be-detected region.

Step 602: Inputting the to-be-detected region with the regional coronary artery inspiration data into a pre-trained coronary artery segmentation model to obtain regional coronary artery segmentation data.

Since the coronary artery segmentation model obtained through training by using any one of the foregoing methods already has a capability of obtaining a coronary artery segmentation result of all regions based on an inspiration of a partial region, the to-be-detected region with the regional coronary artery inspiration data is input into the coronary artery segmentation model, and then the regional coronary artery segmentation data corresponding to the to-be-detected region may be obtained. The regional coronary artery segmentation data is an output result corresponding to the to-be-detected region.

Step 603: Obtaining a comparison result of the regional coronary artery inspiration data and the regional coronary artery segmentation data.

The regional coronary artery inspiration data is a result of a partial inspiration and is not complete and accurate. The regional coronary artery segmentation data output by the coronary artery segmentation model is a more accurate segmentation result that excludes interference and false positives. In general, the regional coronary artery segmentation data is more accurate. However, considering factors such as image region selection, the comparison result of the regional coronary artery inspiration data and the regional coronary artery segmentation data needs to be obtained, so as to extract a more accurate segmentation result.

Step 604: Replacing the to-be-detected region in the to-be-detected image with the comparison result to obtain a replaced to-be-detected image so as to complete the detection step.

The to-be-detected region in the to-be-detected image is replaced with the comparison result, to obtain the replaced to-be-detected image. A to-be-detected region in the current detection step is selected from the replaced to-be-detected image, and a part of an accurate segmentation result in a previous detection step is used as regional coronary artery inspiration data in the current detection step. Connectivity of blood vessels is fully utilized, thereby implementing precise segmentation and improving segmentation robustness.

Step 605: for a plurality of the detection steps corresponding to the to-be-detected image, selecting the to-be-detected region in the current detection step from the replaced to-be-detected image in the previous detection step, and using a part of the comparison result in the previous detection step as the regional coronary artery inspiration data in the current detection step; and outputting a finally replaced to-be-detected image as coronary artery segmentation data after the to-be-detected image is fully traversed and replaced by the comparison result.

An entire segmentation process may include a plurality of the detection steps. The foregoing Step 601 to Step 604 serve as one detection step. The to-be-detected region in the current detection step is selected from the replaced to-be-detected image in the previous detection step, and the part of the comparison result in the previous detection step is used as the regional coronary artery inspiration data in the current detection step. Connectivity of blood vessels is fully utilized, thereby implementing precise segmentation and improving segmentation robustness.

After the to-be-detected image is fully traversed and replaced by the comparison result, a replaced to-be-detected image obtained in the last detection step is output as the coronary artery segmentation data.

According to the coronary artery segmentation method provided in the embodiments of the present application, the to-be-detected region with the regional coronary artery inspiration data is input into the coronary artery segmentation model, to obtain the regional coronary artery segmentation data of the to-be-detected region. A comparison is performed to determine whether more segmentation regions are segmented by using the regional coronary artery segmentation data or the regional coronary artery inspiration data, to obtain the comparison result. The to-be-detected region in the to-be-detected image is replaced with the comparison result, to obtain the replaced to-be-detected image. A new to-be-detected region is selected from the replaced to-be-detected image, and a part of the comparison result in a previous detection step is used as the regional coronary artery inspiration data in a current detection step. The detection step is repeated iteratively until the to-be-detected image is fully traversed and replaced by the comparison result, and then the coronary artery segmentation result is obtained. A part of a segmentation result in the previous detection step is used as regional coronary artery inspiration data in the current detection step, to provide an inspiration for segmentation in the current detection step. In addition, growth connectivity of coronary artery blood vessels is fully utilized, thereby implementing precise segmentation while effectively distinguishing between a coronary artery and a vein false positive, and further implementing strong robustness to artifacts or plaques.

Figure 7:
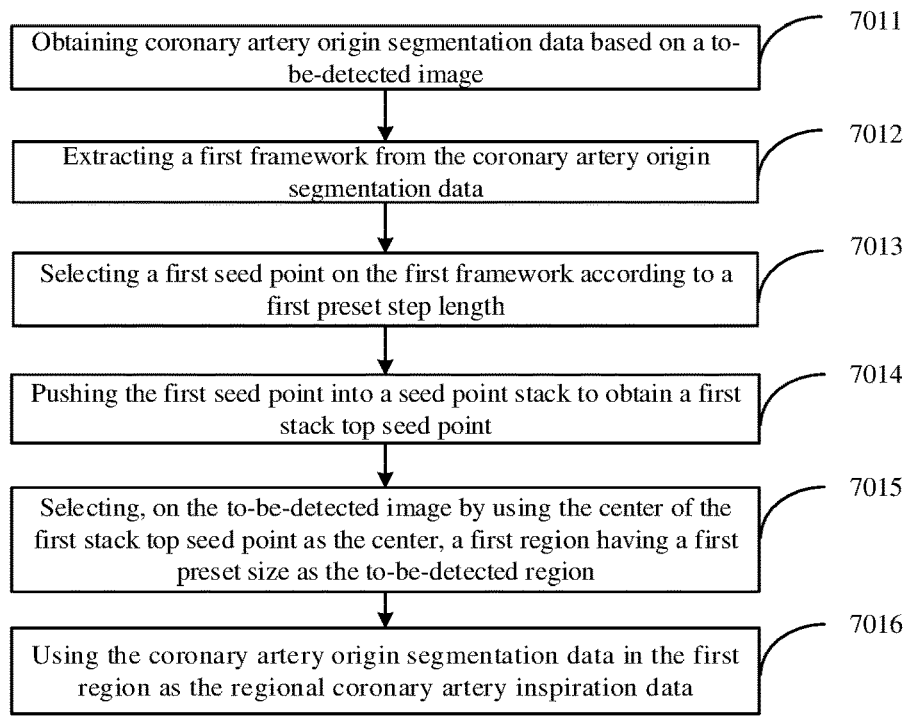
FIG. 7 is a schematic flowchart of obtaining a to-be-detected region and regional coronary artery inspiration data when the to-be-detected region is a coronary artery origin region in a coronary artery segmentation method according to an embodiment of the present application.

FIG. 7 is a schematic flowchart of obtaining a to-be-detected region and regional coronary artery inspiration data when the to-be-detected region is a coronary artery origin region in a coronary artery segmentation method according to an embodiment of the present application. As shown in FIG. 7, the obtaining a to-be-detected region and regional coronary artery inspiration data corresponding to the to-be-detected region when the to-be-detected region is a coronary artery origin region includes the following steps.

Step 7011: Obtaining coronary artery origin segmentation data based on the to-be-detected image.

Specifically, the to-be-detected image is input into a trained origin segmentation module, and a segmentation result of a connection region between an aorta and a coronary artery is obtained. Considering that a structure of an origin part of the coronary artery is relatively simple, false positives and segmentation failures are not easy to occur, so that the coronary artery origin segmentation data may provide key features for subsequent segmentation.

Step 7012: Extracting a first framework from the coronary artery origin segmentation data.

Since the coronary artery origin segmentation data has segmented the aorta from the coronary artery, a first framework representing a contour and orientation of the coronary artery is extracted.

Step 7013: Selecting a first seed point on the first framework according to a first preset step length.

Specifically, the first preset step length is defined according to a specific application scenario, and a value of the first preset step length is not limited in the embodiment of the present application.

Step 7014: Pushing the first seed point into a seed point stack to obtain a first stack top seed point.

Step 7015: Selecting, on the to-be-detected image by using the center of the first stack top seed point as the center, a first region with a first preset size as the to-be-detected region.

Specifically, a value of the first preset size is selected according to a size of the to-be-detected image. For example, when the size of the to-be-detected image is 512×512×512 pixels, the value of the first preset size may be 128×128×128 pixels.

Specifically, the first seed point is selected on the first framework according to the first preset step length. The first seed point is pushed into the seed point stack, to obtain the first stack top seed point. On the to-be-detected image by using the center of the first stack top seed point as the center, the first region with the first preset size is selected as the to-be-detected region. Therefore, the to-be-detected region is obtained through the foregoing operations.

Step 7016: Using the coronary artery origin segmentation data in the first region as the regional coronary artery inspiration data.

Specifically, since the coronary artery origin segmentation data includes a part of the segmentation result of the coronary artery, the coronary artery origin segmentation data in the first region may provide an inspiration during segmentation of the to-be-detected region, making a coronary artery segmentation model output accurate regional coronary artery segmentation data corresponding to the to-be-detected region while fully considering connectivity of blood vessels.

In the embodiment of the present application, a segmentation result of a connection part between the coronary artery and the aorta is obtained through an origin segmentation module. A first seed point is generated and pushed into a seed point stack, and then a first stack top seed point is popped. New segmentation is predicted based on the first region and the coronary artery origin segmentation data in the first region, making the coronary artery segmentation model output accurate regional coronary artery segmentation data corresponding to a to-be-detected region while fully considering connectivity of blood vessels. A comparison is performed to determine whether more segmentation regions are segmented by using the regional coronary artery segmentation data or the regional coronary artery inspiration data, to obtain a comparison result. The to-be-detected region in a to-be-detected image is replaced with the comparison result, to obtain a replaced to-be-detected image. A new to-be-detected region is selected from the replaced to-be-detected image, and a part of the comparison result in a previous detection step is used as the regional coronary artery inspiration data in a current detection step, and the detection step is repeated.

Figure 8:
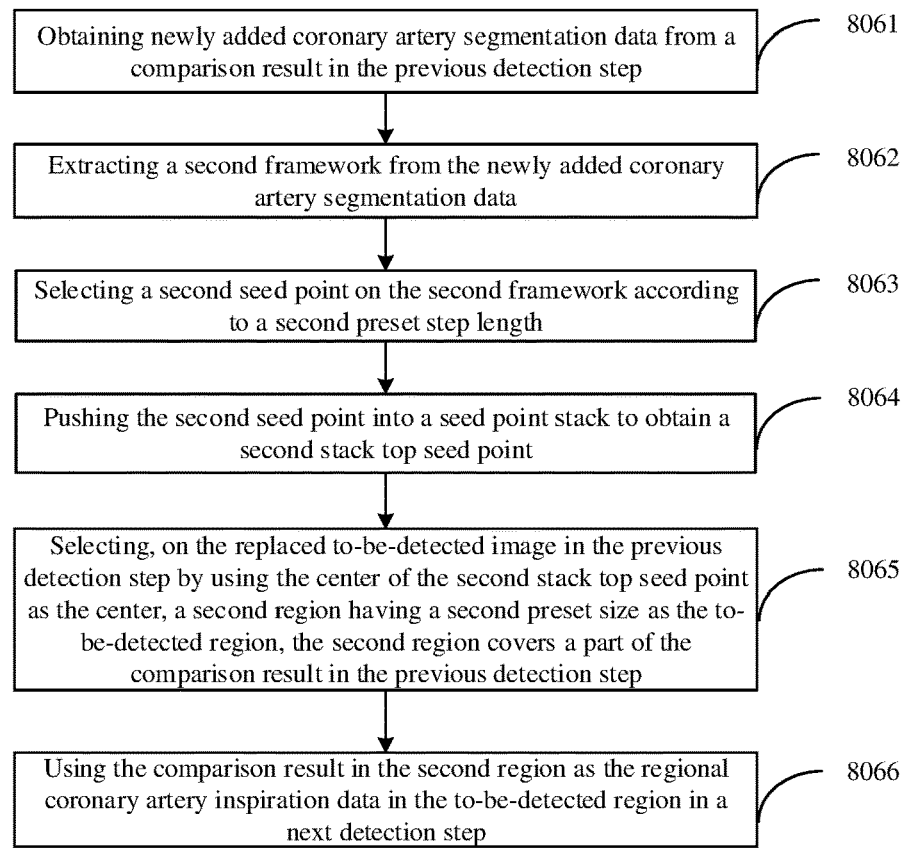
FIG. 8 is a schematic flowchart of obtaining a to-be-detected region and regional coronary artery inspiration data when the to-be-detected region is from a replaced to-be-detected image in the previous detection step of a current detection step in a coronary artery segmentation method according to an embodiment of the present application.

FIG. 8 is a schematic flowchart of obtaining a to-be-detected region and regional coronary artery inspiration data when the to-be-detected region is from a replaced to-be-detected image in the previous detection step of a current detection step in a coronary artery segmentation method according to an embodiment of the present application. The to-be-detected region is from the replaced to-be-detected image in the previous detection step of the current detection step. As shown in FIG. 8, the obtaining a to-be-detected region and regional coronary artery inspiration data corresponding to the to-be-detected region includes the following steps.

Step 8061: Obtaining newly added coronary artery segmentation data from the comparison result in the previous detection step.

Specifically, in the previous detection step, the newly added coronary artery segmentation data is obtained from the comparison result of the regional coronary artery segmentation data and the regional coronary artery inspiration data in the previous detection step. The newly added coronary artery segmentation data is a newly segmented region obtained by comparing the regional coronary artery segmentation data with the regional coronary artery inspiration data.

Step 8062: Extracting a second framework from the newly added coronary artery segmentation data.

Specifically, the newly added coronary artery segmentation data is a new segmentation result obtained based on consideration of connectivity of blood vessels, and the second framework is extracted from the newly added coronary artery segmentation data. Therefore, a part of subsequently obtained to-be-detected region belongs to the segmentation result that has already been obtained, and the other part of the subsequently obtained to-be-detected region belongs to a new to-be-segmented region extending in a direction of blood flow. The second framework is extracted based on a contour and orientation of a coronary artery in the newly added coronary artery segmentation data.

Step 8063: Selecting a second seed point on the second framework according to a second preset step length.

Step 8064: Pushing the second seed point into a seed point stack to obtain a second stack top seed point.

Step 8065: Selecting, on the replaced to-be-detected image in the previous detection step by using the center of the second stack top seed point as the center, a second region with a second preset size as the to-be-detected region, where the second region covers a part of the comparison result in the previous detection step.

Specifically, the method of obtaining the second region based on the second seed point in Step 8063, Step 8064, and Step 8065 is similar to that of obtaining the first region based on the first seed point, and details are not described herein again. However, the second region needs to cover a part of the comparison result in the previous detection step. In this way, a part of the segmentation result of the previous detection step can be fed into a coronary artery segmentation model, to provide an inspiration for detection.

Step 8066: Using the comparison result in the previous detection step in the second region as the regional coronary artery inspiration data.

Specifically, since the second region needs to cover a part of the comparison result in the previous detection step, the comparison result in the previous detection step in the second region is used as accurate output of the previous detection step, to provide an inspiration for segmentation of the current to-be-detected region.

In a further embodiment, when the seed point in the seed point stack is empty, it indicates that coronary artery segmentation data is output after the to-be-detected image is fully traversed and replaced by the comparison result.

Figure 9:
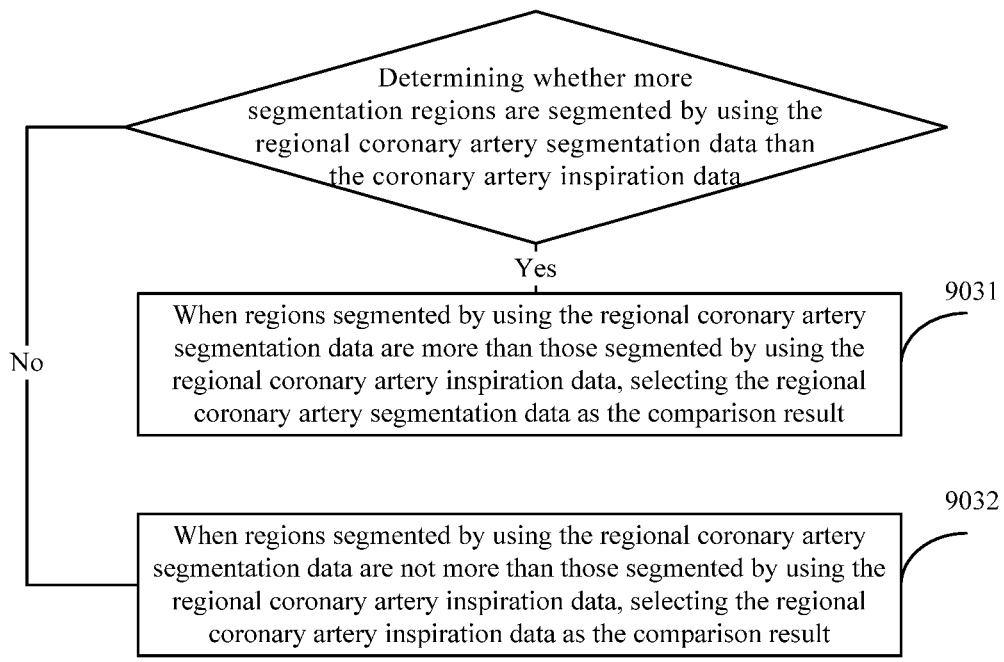
FIG. 9 is a schematic flowchart of obtaining a comparison result in a coronary artery segmentation method according to an embodiment of the present application.

FIG. 9 is a schematic flowchart of obtaining a comparison result in a coronary artery segmentation method according to an embodiment of the present application. As shown in FIG. 9, the obtaining a comparison result of the regional coronary artery inspiration data and the regional coronary artery segmentation data includes the following steps.

Step 9031: When regions segmented by using the regional coronary artery segmentation data are more than those segmented by using the regional coronary artery inspiration data, selecting the regional coronary artery segmentation data as the comparison result; or Step 9032: When regions segmented by using the regional coronary artery segmentation data are not more than those segmented by using the regional coronary artery inspiration data, selecting the regional coronary artery inspiration data as the comparison result.

Specifically, the regional coronary artery segmentation data segmented by a coronary artery segmentation model trained by using the foregoing training method has higher accuracy; however, the regional coronary artery segmentation data may be the same as regional coronary artery inspiration data due to a regional vascular factor and a model factor. When regions segmented by using the regional coronary artery segmentation data are more than those segmented by using the regional coronary artery inspiration data, the regional coronary artery segmentation data is selected as the comparison result. When regions segmented by using the regional coronary artery segmentation data are not more than those segmented by using the regional coronary artery inspiration data, the regional coronary artery inspiration data is selected as the comparison result.

Figure 10:
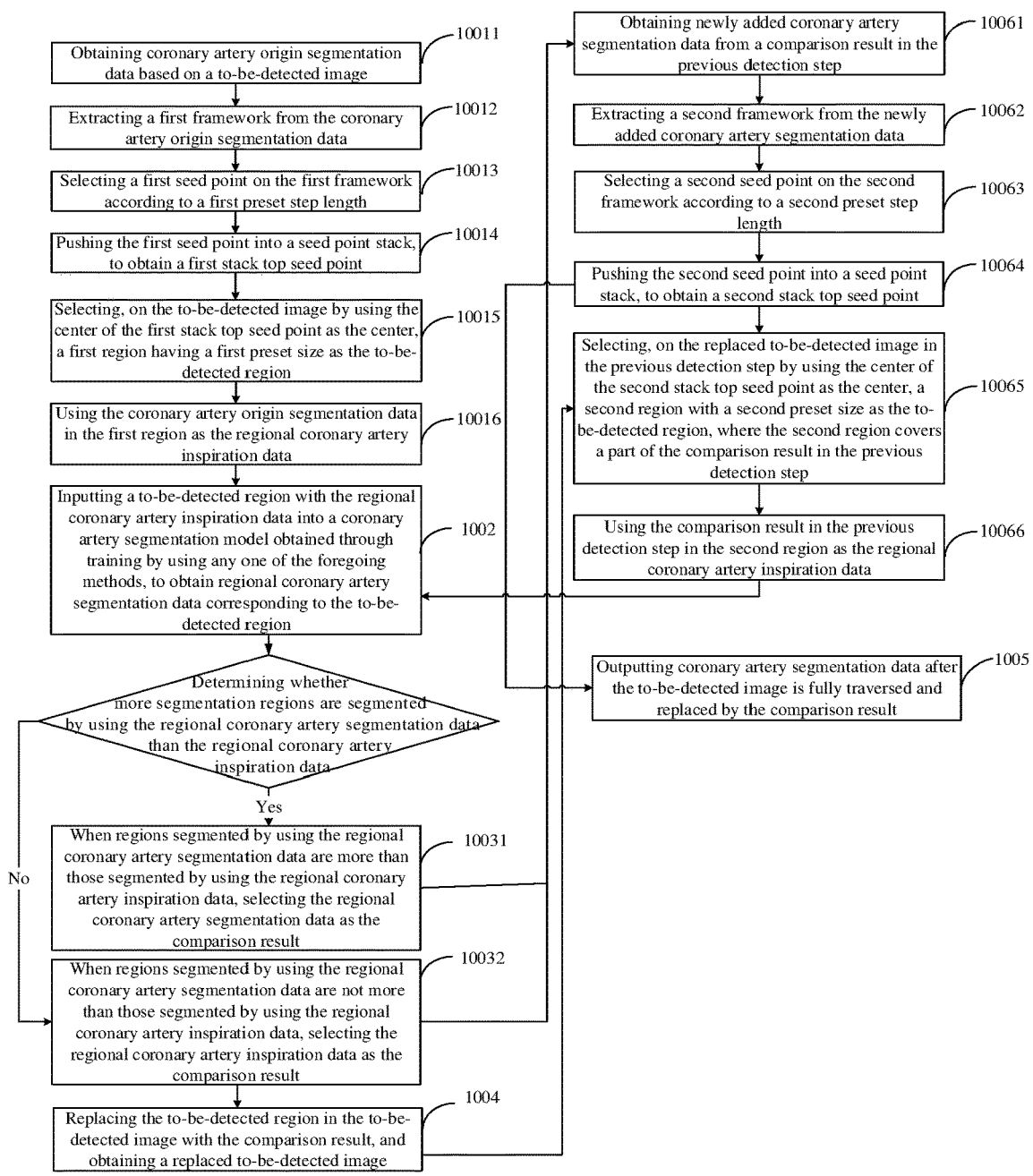
FIG. 10 is a schematic flowchart of a coronary artery segmentation method according to an embodiment of the present application.

FIG. 10 is a schematic flowchart of a coronary artery segmentation method according to an embodiment of the present application.

A cardiac CT image is selected as a to-be-detected image. The to-be-detected image is input into a trained origin segmentation module to segment a connection region between an aorta and a coronary artery, and coronary artery origin segmentation data is obtained (refer to step 10011 shown in FIG. 10). A first framework representing a contour and orientation of the coronary artery is extracted from the coronary artery origin segmentation data (refer to step 10012 shown in FIG. 10). A first seed point is selected on the first framework according to a first preset step length. The first seed point is pushed into a seed point stack, to obtain a first stack top seed point. On the to-be-detected image by using the center of the first stack top seed point as the center, the first region with a first preset size is selected as a first to-be-detected region (refer to steps 10013, 10014, and 10015 in FIG. 10). The coronary artery origin segmentation data in the first region is used as first regional coronary artery inspiration data (refer to step 10016 in FIG. 10). A to-be-detected region with the regional coronary artery inspiration data is input into a coronary artery segmentation model, and first regional coronary artery segmentation data corresponding to the first to-be-detected region may be obtained (refer to step 1002 in FIG. 10). When regions segmented by using the first regional coronary artery segmentation data are more than those segmented by using the first regional coronary artery inspiration data, the first regional coronary artery segmentation data is selected as a comparison result (refer to step 10031 in FIG. 10); or when regions segmented by using the first regional coronary artery segmentation data are not more than those segmented by using the first regional coronary artery inspiration data, the first regional coronary artery inspiration data is selected as a comparison result (refer to step 10032 in FIG. 10). The first to-be-detected region in a to-be-detected image is replaced with the comparison result, to obtain a replaced to-be-detected image (refer to step 1004 in FIG. 10), and a first detection step is completed.

Newly added coronary artery segmentation data is obtained from the comparison result in the previous detection step (refer to step 10061 in FIG. 10). A second framework is extracted from the newly added coronary artery segmentation data (refer to step 10062 shown in FIG. 10). A second seed point is selected on the second framework according to a second preset step length. The second seed point is pushed into a seed point stack, to obtain a second stack top seed point. On the replaced to-be-detected image in the previous detection step by using the center of the second stack top seed point as the center, a second region with a second preset size is selected as a second to-be-detected region, and the second region covers a part of the comparison result in the previous detection step (refer to steps 10063, 10064, and 10065 in FIG. 10). Since the second region covers a part of the comparison result in the previous detection step, the comparison result in the previous detection step in the second region is used as second regional coronary artery inspiration data (refer to step 10066 shown in FIG. 10). The second to-be-detected region with the second regional coronary artery inspiration data is input into the coronary artery segmentation model, and second regional coronary artery segmentation data is obtained (refer to step 1002 in FIG. 10). When regions segmented by using the second regional coronary artery segmentation data are more than those segmented by using the second regional coronary artery inspiration data, the second regional coronary artery segmentation data is selected as the comparison result (refer to step 10031 in FIG. 10); or When regions segmented by using the second regional coronary artery segmentation data are not more than those segmented by using the second regional coronary artery inspiration data, the second regional coronary artery inspiration data is selected as the comparison result (refer to step 10032 in FIG. 10). The second to-be-detected region in a to-be-detected image is replaced with the comparison result, to obtain a replaced to-be-detected image (refer to step 1004 in FIG. 10), and a second detection step is completed.

The foregoing second detection step is repeated iteratively until the to-be-detected image is fully traversed and replaced by the comparison result, and then coronary artery segmentation data is output (refer to step 1005 in FIG. 10).

Exemplary Apparatus for Training Coronary Artery Segmentation Model

Figure 11:
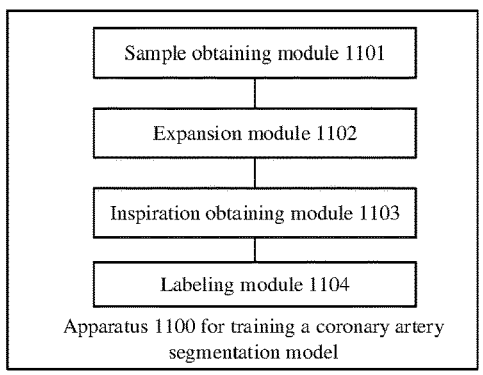
FIG. 11 is a schematic structural diagram of an apparatus for training a coronary artery segmentation model according to an embodiment of the present application.

FIG. 11 is a schematic structural diagram of an apparatus for training a coronary artery segmentation model according to an embodiment of the present application. As shown in FIG. 11, the apparatus 1100 for training a coronary artery segmentation model includes:

a sample obtaining module 1101, configured to obtain a sample, where the sample includes to-be-identified region blood vessel data and coronary artery labeling data; an expansion module 1102, configured to add interference data to the to-be-identified region blood vessel data to obtain to-be-identified blood vessel expansion data; an inspiration obtaining module 1103, configured to obtain coronary artery inspiration data based on the coronary artery labeling data, where the coronary artery inspiration data is used to provide an inspiration during labeling of the to-be-identified region blood vessel data, where the obtaining coronary artery inspiration data based on the coronary artery labeling data includes: selecting a part of the coronary artery labeling data as the coronary artery inspiration data; and a labeling module 1104, configured to input the sample with the to-be-identified blood vessel expansion data, the coronary artery inspiration data, and the coronary artery labeling data into the neural network model, and train the neural network model by using the coronary artery labeling data as an output target, so that the neural network model can output the coronary artery labeling data based on the coronary artery inspiration data on the sample.

In the embodiment of the present application, interference data is added to the to-be-identified region blood vessel data of the sample by using the expansion module 1102, to obtain the to-be-identified blood vessel expansion data. The coronary artery labeling data of the sample is processed by using the inspiration obtaining module 1103, to obtain coronary artery inspiration data used to provide an expiration for the to-be-identified region blood vessel data during segmentation. The sample with the to-be-identified blood vessel expansion data, the coronary artery inspiration data, and the coronary artery labeling data is input, by using the labeling module 1104, into a neural network model for training, so that the neural network model can output the coronary artery labeling data based on the coronary artery inspiration data on the sample. Due to the existence of interference data in the to-be-identified blood vessel expansion data, the neural network model is trained by using the sample, to make the neural network model learn how to distinguish interference, thereby implementing precise segmentation. The coronary artery inspiration data provides a partial inspiration. Due to connectivity of coronary arteries, the neural network model is trained by using the sample, to make the neural network model learn how to obtain all coronary artery segmentation results based on the partial inspiration.

Figure 12:
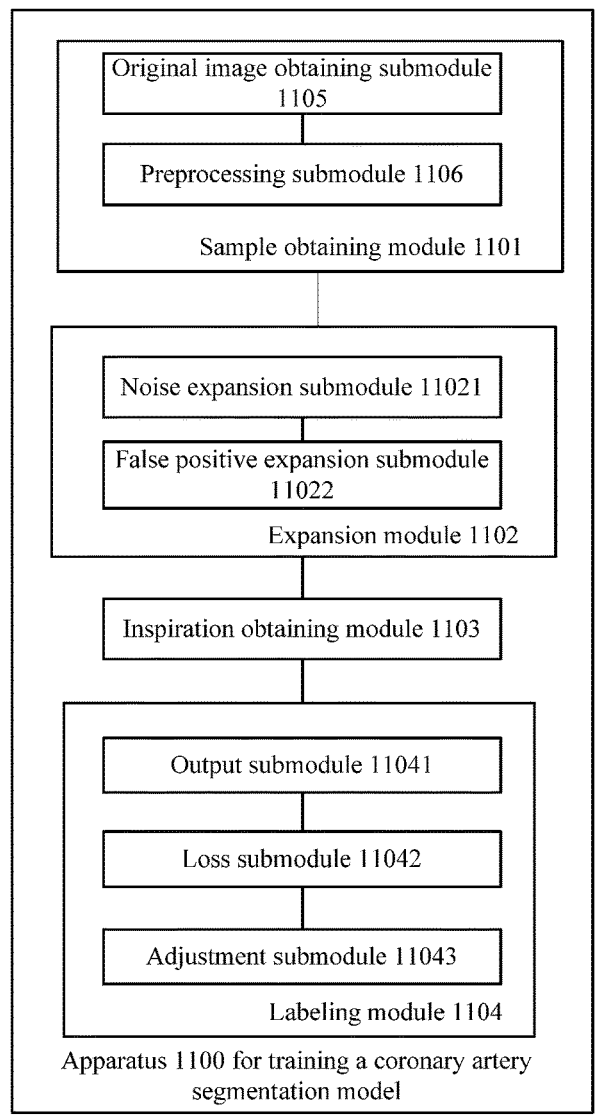
FIG. 12 is a schematic structural diagram of an apparatus for training a coronary artery segmentation model according to an embodiment of the present application.

FIG. 12 is a schematic structural diagram of an apparatus for training a coronary artery segmentation model according to an embodiment of the present application. As shown in FIG. 12, an expansion module 1102 includes: a noise expansion submodule 11021, configured to add noise data to to-be-identified region blood vessel data, where the noise data includes plaque data and artifact data; and a false positive expansion submodule 11022, configured to add false positive data to the to-be-identified region blood vessel data.

In an embodiment, an inspiration obtaining module 1103 is further configured to select a part of coronary artery labeling data as coronary artery inspiration data.

In an embodiment, as shown in FIG. 12, a labeling module 1104 includes: an output submodule 11041, configured to train a neural network model by using a sample with to-be-identified blood vessel expansion data and the coronary artery inspiration data to obtain the coronary artery segmentation data; a loss submodule 11042, configured to obtain a loss result based on the coronary artery segmentation data and the coronary artery labeling data; and an adjustment submodule 11043, configured to adjust parameters of the neural network model based on the loss result.

In an embodiment, as shown in FIG. 12, the sample obtaining module 1101 further includes: an original image obtaining submodule 1105, configured to obtain an original image, where the original image includes a to-be-identified blood vessel and a coronary artery label; and a preprocessing submodule 1106, configured to perform sliding window processing on the original image to obtain a plurality of the samples.

Exemplary Coronary Artery Segmentation Apparatus

Figure 13:
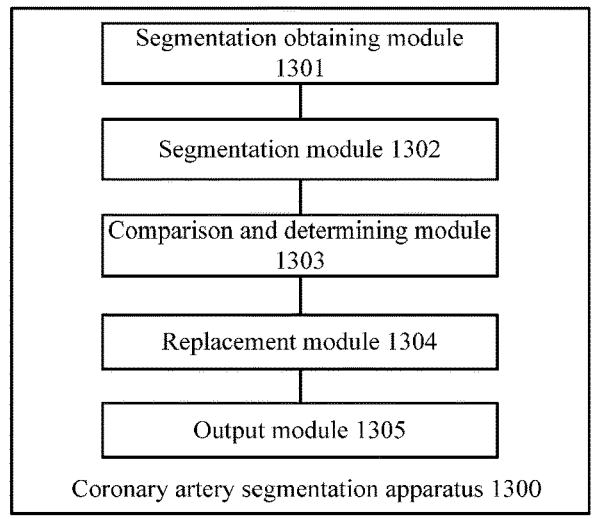
FIG. 13 is a schematic structural diagram of a coronary artery segmentation apparatus according to an embodiment of the present application.

FIG. 13 is a schematic structural diagram of a coronary artery segmentation apparatus according to an embodiment of the present application. As shown in FIG. 13, the coronary artery segmentation apparatus 1300 includes: a segmentation obtaining module 1301, configured to obtain a to-be-detected region and regional coronary artery inspiration data corresponding to the to-be-detected region, where the to-be-detected region is a part of the to-be-detected image, and the regional coronary artery inspiration data is used to provide an inspiration during segmentation of the to-be-detected region; a segmentation module 1302, configured to input the to-be-detected region with the regional coronary artery inspiration data into a coronary artery segmentation model trained by using any one of the methods for training the coronary artery segmentation model to obtain regional coronary artery segmentation data; a comparison and determining module 1303, configured to obtain a comparison result of the regional coronary artery segmentation data and the regional coronary artery inspiration data; a replacement module 1304, configured to replace the to-be-detected region in a to-be-detected image with the comparison result to obtain a replaced to-be-detected image so as to complete a detection step; and an output module 1305, configured to repeat the detection step, where for a plurality of detection steps corresponding to the to-be-detected image, a to-be-detected region in a current detection step is selected from a replaced to-be-detected image in a previous detection step, and a part of the comparison result in the previous detection step is used as the regional coronary artery inspiration data in the current detection step; and output coronary artery segmentation data after the to-be-detected image is fully traversed and replaced by the comparison result.

In the embodiment of the present application, the coronary artery segmentation module 1302 inputs a to-be-detected region with regional coronary artery inspiration data into the foregoing coronary artery segmentation model, to obtain regional coronary artery segmentation data of the to-be-detected region. The comparison and determining module 1303 performs a comparison to determine whether more segmentation regions are segmented by using the regional coronary artery segmentation data or the regional coronary artery inspiration data, to obtain a comparison result. The replacement module 1304 replaces the to-be-detected region in a to-be-detected image with the comparison result, and obtains a replaced to-be-detected image. The output module 1305 repeats a detection step iteratively until the to-be-detected image is fully traversed and replaced by the comparison result, and then a coronary artery segmentation result is obtained.

According to the coronary artery segmentation apparatus provided in the embodiment of the present application, a part of a segmentation result in the previous detection step is used as regional coronary artery inspiration data in a current detection step, to provide an inspiration for segmentation in the current detection step. In addition, growth connectivity of coronary artery blood vessels is fully utilized, thereby implementing precise segmentation while effectively distinguishing between a coronary artery and a vein false positive, and further implementing strong robustness to artifacts or plaques.

Figure 14:
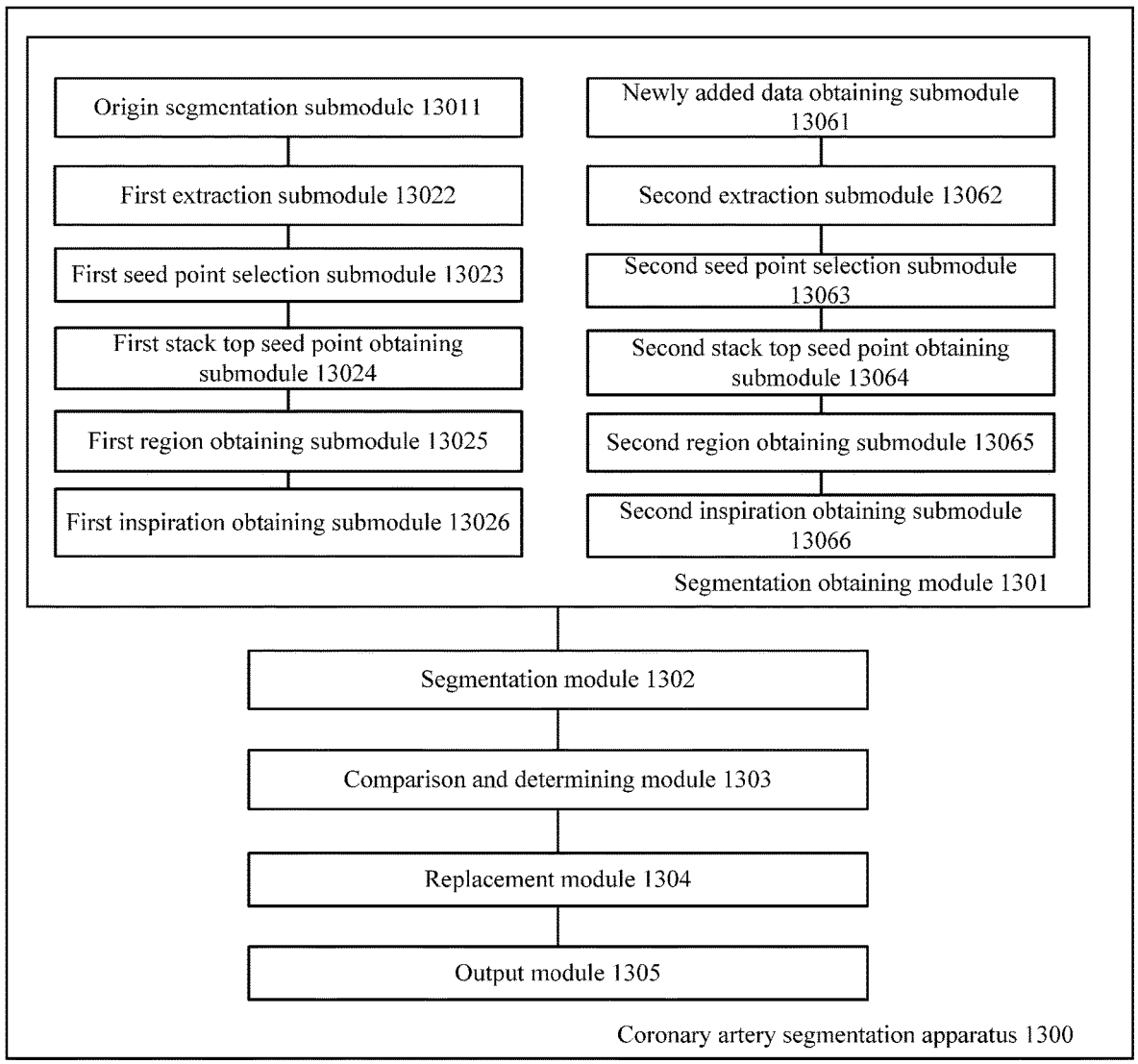
FIG. 14 is a schematic structural diagram of a coronary artery segmentation apparatus according to an embodiment of the present application.

FIG. 14 is a schematic structural diagram of a coronary artery segmentation apparatus according to an embodiment of the present application. As shown in FIG. 14, a to-be-detected region is a coronary artery origin region. A segmentation obtaining module 1301 includes: an origin segmentation submodule 13011, configured to obtain coronary artery origin segmentation data based on a to-be-detected image; a first extraction submodule 13022, configured to extract a first framework from the coronary artery origin segmentation data; a first seed point selection submodule 13023, configured to select a first seed point on the first framework according to a first preset step length; a first stack top seed point obtaining submodule 13024, configured to push the first seed point into a seed point stack, to obtain a first stack top seed point; a first region obtaining submodule 13025, configured to select, on the to-be-detected image by using the center of the first stack top seed point as the center, a first region with a first preset size as the to-be-detected region; and a first inspiration obtaining submodule 13026, configured to use the coronary artery origin segmentation data in the first region as regional coronary artery inspiration data.

In an embodiment, as shown in FIG. 14, a to-be-detected region is from a replaced to-be-detected image in a previous detection step of a current detection step. A segmentation obtaining module 1301 further includes a newly added data obtaining submodule 13061, configured to obtain newly added coronary artery segmentation data from a comparison result in the previous detection step; a second extraction submodule 13062, configured to extract a second framework from the newly added coronary artery segmentation data; a second seed point selection submodule 13063, configured to select a second seed point on the second framework according to a second preset step length; a second stack top seed point obtaining submodule 13064, configured to push the second seed point into the seed point stack to obtain a second stack top seed point; a second region obtaining submodule 13065, configured to select, on the replaced to-be-detected image by using the center of the second stack top seed point as the center, a second region with a second preset size as the to-be-detected region in the current detection step, where the second region covers a part of the comparison result in the replaced to-be-detected image in the previous detection step, a second region with a second preset size is selected as the to-be-detected region, and the second region covers the part of the comparison result in the previous detection step; and a second inspiration obtaining submodule 13066, configured to use the comparison result in the previous detection step in the second region as the regional coronary artery inspiration data.

In an embodiment, a comparison and determining module 1303 is further configured to: when regions segmented by using regional coronary artery segmentation data are more than those segmented by using regional coronary artery inspiration data, select the regional coronary artery segmentation data as the comparison result; or when regions segmented by using the regional coronary artery segmentation data are not more than those segmented by using the regional coronary artery inspiration data, select the regional coronary artery inspiration data as the comparison result.

Exemplary Electronic Device

Figure 15:
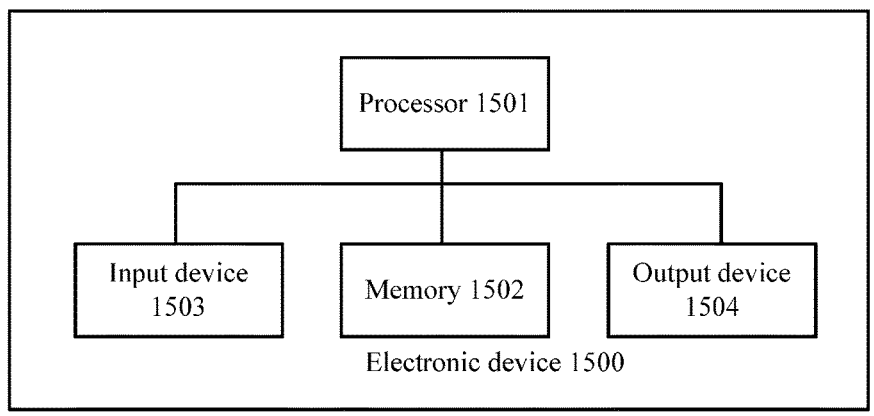
FIG. 15 is a schematic structural diagram of an electronic device according to an embodiment of the present application.

FIG. 15 is a schematic structural diagram of an electronic device according to an embodiment of the present application. As shown in FIG. 15, the electronic device 1500 includes one or more processors 1501 and a memory 1502.

The processor 1501 may be a central processing unit (CPU) or a processing unit in another form that has a data handling capacity and/or instruction execution capacity, and other components in the electronic device 1500 may be controlled to perform expected functions.

The memory 1502 may include one or more computer program products. The computer program product may include computer-readable storage mediums in various forms, for example, a volatile memory and/or a nonvolatile memory. The volatile memory may include, for example, a random access memory (RAM) and/or a high-speed buffer memory (cache), or the like. The nonvolatile memory may include, for example, a read-only memory (ROM), a hard disk, a flash memory, or the like. The computer-readable storage medium may store one or more computer program instructions. The processor 1501 can run the program instruction, to implement the method for training a coronary artery segmentation model and the coronary artery segmentation method according to the foregoing embodiments of the present application and/or other expected functions. In an example, the electronic device 1500 may further include: an input device 1503 and an output device 1504. These components may be interconnected to each other by using a bus system and/or connecting mechanisms in other forms (not shown in the figure).

For example, the output device 1503 may be the foregoing microphone or microphone array, and is configured to capture an input signal of a sound source. When the electronic device is single unit equipment, the input device 1503 may be a communication network connector.

In addition, the input device 1503 may further include, for example, a medical image collection apparatus.

The output device 1504 may output various information, including determined target object information, and the like. The output device 1504 may include, for example, a display, a speaker, a printer, a communication network and a remote output device connected thereto, and the like.

Certainly, for simplicity, FIG. 15 only shows some of components in the electronic device 1500 that are related to the present application, and does not show components such as a bus, an input/output interface, and the like. In addition, according to a specific application situation, the electronic device 1500 may further include any other proper components.

Exemplary Computer Program Product and Computer-Readable Storage Medium

In addition to the foregoing methods and devices, the embodiments of the present application may also be computer program products. The computer program product includes computer program instructions. When the computer program instructions are run by a processor, the processor implements the steps of the exemplary method for training a coronary artery segmentation model and the exemplary coronary artery segmentation method according to the embodiments of the present application described in the foregoing sections "Exemplary method for training the coronary artery segmentation model" and "Exemplary coronary artery segmentation method" in this specification.

Computer program code for carrying out operations of the embodiments of the present application may be written in one or more programming languages, or combinations thereof, including an object oriented programming language such as Java, C++, and conventional procedural programming language, such as the "C" language or a similar programming language. The program code may be entirely executed on a user's computing device, partially on the user's computing device, executed as an independent software package, partially executed on the user's computing device and partially executed on a remote computing device, or entirely executed on the remote computing device or server.

In addition, the embodiments of the present application may also be computer-readable storage mediums. The computer-readable storage medium stores computer program instructions. When the computer program instructions are run by a processor, the processor implements the steps of the method for training a coronary artery segmentation model and the coronary artery segmentation method according to the embodiments of the present application described in the foregoing sections "Exemplary method for training the coronary artery segmentation model" and "Exemplary coronary artery segmentation method" in this specification.

The computer-readable storage medium may use any combination of one or more readable media. The readable medium may be a readable signal medium or readable storage medium. The readable storage medium may include but is, for example, not limited to, an electronic, magnetic, optical, electromagnetic, infrared, or semiconductor system, apparatus, or means, or any combination thereof. More specific examples (a non-exhaustive list) of the readable storage medium include: an electrical connection having one or more wires, a portable disk, a hard disk, a random access memory (RAM), a read-only memory (ROM), an erasable programmable read-only memory (EPROM or a flash memory), an optical fiber, a portable compact disk read only memory (CD-ROM), an optical storage means, a magnetic storage means, or any suitable combination of the above.

The basic principles of the present application are described with reference to the specific embodiments. However, it should be noted that, the advantages, merits, effects, and the like mentioned in the present application are only examples but not limitations. It cannot be considered that these advantages, merits, effects, and the like are necessary for each embodiment of the present application.

The foregoing examples are used for purposes of illustration and description. In addition, the description is not intended to limit the embodiments of the present application to the forms disclosed herein. Although a quantity of exemplary aspects and embodiments have been discussed above, those skilled in the art will recognize some variations, modifications, changes, additions, and sub-combinations thereof.

What is claimed is:

1. A coronary artery segmentation method, comprising:
    iteratively performing a detection step for a to-be-detected image, wherein the detection step comprises the following steps:
    obtaining a to-be-detected region and regional coronary artery inspiration data corresponding to the to-be-detected region, wherein the to-be-detected region is a part of the to-be-detected image, and the regional coronary artery inspiration data is used to provide an inspiration during segmentation of the to-be-detected region;
    inputting the to-be-detected region with the regional coronary artery inspiration data into a pre-trained coronary artery segmentation model to obtain regional coronary artery segmentation data;
    obtaining a comparison result of the regional coronary artery segmentation data and the regional coronary artery inspiration data;
    replacing the to-be-detected region in the to-be-detected image with the comparison result to obtain a replaced to-be-detected image so as to complete the detection step;
    for a plurality of the detection steps corresponding to the to-be-detected image, selecting the to-be-detected region in a current detection step from the replaced to-be-detected image in a previous detection step, and using a part of the comparison result in the previous detection step as the regional coronary artery inspiration data in the current detection step;
    outputting a finally replaced to-be-detected image as coronary artery segmentation data after the to-be-detected image is fully traversed and replaced by the comparison result, and
    the obtaining a to-be-detected region and regional coronary artery inspiration data corresponding to the to-be-detected region comprises:
    obtaining newly added coronary artery segmentation data from the comparison result in the previous detection step;
    extracting a second framework from the newly added coronary artery segmentation data;
    selecting a second seed point on the second framework according to a second preset step length;
    pushing the second seed point into a seed point stack to obtain a second stack top seed point;
    selecting, on the replaced to-be-detected image in the previous detection step by using the center of the second stack top seed point as the center, a second region with a second preset size as the to-be-detected region, wherein the second region covers a part of the comparison result in the previous detection step; and
    using the comparison result in the previous detection step in the second region as the regional coronary artery inspiration data.

2. The coronary artery segmentation method according to claim 1, wherein the to-be-detected region is a coronary artery origin region; and
    the obtaining a to-be-detected region and regional coronary artery inspiration data corresponding to the to-be-detected region comprises:
    obtaining coronary artery origin segmentation data based on the to-be-detected image;
    extracting a first framework from the coronary artery origin segmentation data;
    selecting a first seed point on the first framework according to a first preset step length;
    pushing the first seed point into a seed point stack to obtain a first stack top seed point;
    selecting, on the to-be-detected image by using the center of the first stack top seed point as the center, a first region with a first preset size as the to-be-detected region; and
    using the coronary artery origin segmentation data in the first region as the regional coronary artery inspiration data.

3. The coronary artery segmentation method according to claim 1, wherein a training method of the coronary artery segmentation model comprises:
    obtaining a sample, wherein the sample comprises to-be-identified region blood vessel data and coronary artery labeling data;
    adding interference data to the to-be-identified region blood vessel data to obtain to-be-identified blood vessel expansion data;
    obtaining coronary artery inspiration data based on the coronary artery labeling data, wherein the coronary artery inspiration data is used to provide, during labeling of the to-be-identified region blood vessel data, an inspiration for providing a neural network model with an accurate origin point; and
    inputting the sample with the to-be-identified blood vessel expansion data, the coronary artery inspiration data, and the coronary artery labeling data into the neural network model, and training the neural network model, so that the neural network model can output the coronary artery labeling data based on the coronary artery inspiration data on the sample; and
    the obtaining coronary artery inspiration data based on the coronary artery labeling data comprises:
    selecting a part of the coronary artery labeling data as the coronary artery inspiration data.

4. The coronary artery segmentation method according to claim 3, wherein the adding interference data to the to-be-identified region blood vessel data to obtain to-be-identified blood vessel expansion data comprises:
    adding noise data to the to-be-identified region blood vessel data, wherein the noise data comprises plaque data and artifact data; and
    adding false positive data to the to-be-identified region blood vessel data.

5. The coronary artery segmentation method according to claim 3, wherein the inputting the sample with the to-be-identified blood vessel expansion data, the coronary artery inspiration data, and the coronary artery labeling data into the neural network model, and training the neural network model comprises:

training the neural network model by using the sample with the to-be-identified blood vessel expansion data and the coronary artery inspiration data to obtain the coronary artery segmentation data;
obtaining a loss result based on the coronary artery segmentation data and the coronary artery labeling data; and
adjusting parameters of the neural network model based on the loss result.

6. The coronary artery segmentation method according to claim 3, wherein the obtaining a sample comprises:
obtaining an original image, wherein the original image comprises a to-be-identified blood vessel and a coronary artery label; and
performing sliding window processing on the original image to obtain a plurality of the samples.

7. An electronic device, comprising:
a processor; and
a memory, wherein the memory stores computer program instructions, and when the computer program instructions are run by the processor, the processor is configured to implement a coronary artery segmentation method, the coronary artery segmentation method comprising:
iteratively performing a detection step for a to-be-detected image, wherein the detection step comprises the following steps:
obtaining a to-be-detected region and regional coronary artery inspiration data corresponding to the to-be-detected region, wherein the to-be-detected region is a part of the to-be-detected image, and the regional coronary artery inspiration data is used to provide an inspiration during segmentation of the to-be-detected region;
inputting the to-be-detected region with the regional coronary artery inspiration data into a pre-trained coronary artery segmentation model to obtain regional coronary artery segmentation data;
obtaining a comparison result of the regional coronary artery segmentation data and the regional coronary artery inspiration data;
replacing the to-be-detected region in the to-be-detected image with the comparison result to obtain a replaced to-be-detected image so as to complete the detection step;
for a plurality of the detection steps corresponding to the to-be-detected image, selecting the to-be-detected region in a current detection step from the replaced to-be-detected image in a previous detection step, and using a part of the comparison result in the previous detection step as the regional coronary artery inspiration data in the current detection step;
outputting a finally replaced to-be-detected image as coronary artery segmentation data after the to-be-detected image is fully traversed and replaced by the comparison result, wherein the to-be-detected region is a coronary artery origin region, and
the obtaining a to-be-detected region and regional coronary artery inspiration data corresponding to the to-be-detected region comprises:
obtaining newly added coronary artery segmentation data from the comparison result in the previous detection step;
extracting a second framework from the newly added coronary artery segmentation data;
selecting a second seed point on the second framework according to a second preset step length;
pushing the second seed point into a seed point stack to obtain a second stack top seed point;
selecting, on the replaced to-be-detected image in the previous detection step by using the center of the second stack top seed point as the center, a second region with a second preset size as the to-be-detected region, wherein the second region covers a part of the comparison result in the previous detection step; and
using the comparison result in the previous detection step in the second region as the regional coronary artery inspiration data.

8. The electronic device according to claim 7, wherein the to-be-detected region is a coronary artery origin region; and
the obtaining a to-be-detected region and regional coronary artery inspiration data corresponding to the to-be-detected region comprises:
obtaining coronary artery origin segmentation data based on the to-be-detected image;
extracting a first framework from the coronary artery origin segmentation data;
selecting a first seed point on the first framework according to a first preset step length;
pushing the first seed point into a seed point stack to obtain a first stack top seed point;
selecting, on the to-be-detected image by using the center of the first stack top seed point as the center, a first region with a first preset size as the to-be-detected region; and
using the coronary artery origin segmentation data in the first region as the regional coronary artery inspiration data.

9. The electronic device according to claim 7, wherein a training method of the coronary artery segmentation model comprises:
obtaining a sample, wherein the sample comprises to-be-identified region blood vessel data and coronary artery labeling data;
adding interference data to the to-be-identified region blood vessel data to obtain to-be-identified blood vessel expansion data;
obtaining coronary artery inspiration data based on the coronary artery labeling data, wherein the coronary artery inspiration data is used to provide, during labeling of the to-be-identified region blood vessel data, an inspiration for providing a neural network model with an accurate origin point; and
inputting the sample with the to-be-identified blood vessel expansion data, the coronary artery inspiration data, and the coronary artery labeling data into the neural network model, and training the neural network model; and
the obtaining coronary artery inspiration data based on the coronary artery labeling data comprises:
selecting a part of the coronary artery labeling data as the coronary artery inspiration data.

10. The electronic device according to claim 9, wherein the adding interference data to the to-be-identified region blood vessel data to obtain to-be-identified blood vessel expansion data comprises:
adding noise data to the to-be-identified region blood vessel data, wherein the noise data comprises plaque data and artifact data; and
adding false positive data to the to-be-identified region blood vessel data.

11. The electronic device according to claim 9, wherein the inputting the sample with the to-be-identified blood vessel expansion data, the coronary artery inspiration data, and the coronary artery labeling data into the neural network model, and training the neural network model comprises:
- training the neural network model by using the sample with the to-be-identified blood vessel expansion data and the coronary artery inspiration data to obtain the coronary artery segmentation data;
- obtaining a loss result based on the coronary artery segmentation data and the coronary artery labeling data; and
- adjusting parameters of the neural network model based on the loss result.

12. The electronic device according to claim 9, wherein the obtaining a sample comprises:
- obtaining an original image, wherein the original image comprises a to-be-identified blood vessel and a coronary artery label; and
- performing sliding window processing on the original image to obtain a plurality of the samples.

13. A non-transitory computer-readable storage medium, wherein the non-transitory computer-readable storage medium stores a computer program, and when the computer program is run by a processor, the processor is configured to implement a coronary artery segmentation method, the coronary artery segmentation method comprising:
- iteratively performing a detection step for a to-be-detected image, wherein the detection step comprises the following steps:
- obtaining a to-be-detected region and regional coronary artery inspiration data corresponding to the to-be-detected region, wherein the to-be-detected region is a part of the to-be-detected image, and the regional coronary artery inspiration data is used to provide an inspiration during segmentation of the to-be-detected region;
- inputting the to-be-detected region with the regional coronary artery inspiration data into a pre-trained coronary artery segmentation model to obtain regional coronary artery segmentation data;
- obtaining a comparison result of the regional coronary artery segmentation data and the regional coronary artery inspiration data;
- replacing the to-be-detected region in the to-be-detected image with the comparison result to obtain a replaced to-be-detected image so as to complete the detection step;
- for a plurality of the detection steps corresponding to the to-be-detected image, selecting the to-be-detected region in a current detection step from the replaced to-be-detected image in a previous detection step, and using a part of the comparison result in the previous detection step as the regional coronary artery inspiration data in the current detection step;
- outputting a finally replaced to-be-detected image as coronary artery segmentation data after the to-be-detected image is fully traversed and replaced by the comparison result, and
- the obtaining a to-be-detected region and regional coronary artery inspiration data corresponding to the to-be-detected region comprises:
- obtaining newly added coronary artery segmentation data from the comparison result in the previous detection step;
- extracting a second framework from the newly added coronary artery segmentation data;
- selecting a second seed point on the second framework according to a second preset step length;
- pushing the second seed point into a seed point stack to obtain a second stack top seed point;
- selecting, on the replaced to-be-detected image in the previous detection step by using the center of the second stack top seed point as the center, a second region with a second preset size as the to-be-detected region, wherein the second region covers a part of the comparison result in the previous detection step; and
- using the comparison result in the previous detection step in the second region as the regional coronary artery inspiration data.

* * * * *